(12) United States Patent
Roeland et al.

(10) Patent No.: US 10,554,793 B2
(45) Date of Patent: Feb. 4, 2020

(54) ROUTING OF MPTCP SUBFLOWS

(71) Applicant: TELEFONAKTIEBOLAGET LM ERICSSON (PUBL), Stockholm (SE)

(72) Inventors: Dinand Roeland, Sollentuna (SE); Stefan Rommer, Västra Frölunda (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 60 days.

(21) Appl. No.: 15/500,581

(22) PCT Filed: Jul. 31, 2014

(86) PCT No.: PCT/SE2014/050912
§ 371 (c)(1),
(2) Date: Jan. 31, 2017

(87) PCT Pub. No.: WO2016/018183
PCT Pub. Date: Feb. 4, 2016

(65) Prior Publication Data
US 2017/0223148 A1    Aug. 3, 2017

(51) Int. Cl.
*H04L 29/06* (2006.01)
*H04W 76/22* (2018.01)
(Continued)

(52) U.S. Cl.
CPC ............ *H04L 69/163* (2013.01); *H04L 12/66* (2013.01); *H04L 61/256* (2013.01); *H04L 69/14* (2013.01);
(Continued)

(58) Field of Classification Search
None
See application file for complete search history.

(56) References Cited

U.S. PATENT DOCUMENTS

2012/0144062 A1* 6/2012 Livet ...................... H04L 45/24
                                                                 709/239
2012/0164979 A1* 6/2012 Bachmann ............ H04L 63/164
                                                                 455/411
(Continued)

FOREIGN PATENT DOCUMENTS

WO    2014090335 A1    6/2014

OTHER PUBLICATIONS

Deng, et al., Use-cases and Requirements for MPTCP Proxy in ISP Networks, draft-deng-mptcp-proxy-00.txt, MPTCP Working Group Internet-Draft, May 29, 2014.
WLAN RF Architecture Primer: Single-Channel and Adaptive Multi-Channel Models, Aruba Networks, Inc., 2013.

*Primary Examiner* — Huy D Vu
*Assistant Examiner* — Bao G Nguyen

(57) ABSTRACT

A method performed in a source gateway logically positioned in a first wireless access network between a radio device and a first mobility anchor. The source gateway comprises an MTCP proxy for a TCP flow between the device and a peer comprising at least two subflows between the device and the source gateway, including a first subflow over the first network and a second subflow over a second wireless access network. The method comprises receiving uplink data of the second subflow from a second gateway logically positioned in the second network between the device and a second mobility anchor, sending downlink data of the second subflow to said second gateway, moving the proxy from the source gateway to a target gateway logically positioned in the first network between the device and the first mobility anchor, as part of a handover of the radio device, forwarding downlink data to the target gateway, and forwarding the received uplink data of the second subflow to the target gateway.

13 Claims, 33 Drawing Sheets

(51) Int. Cl.
*H04W 76/15* (2018.01)
*H04W 36/00* (2009.01)
*H04L 12/66* (2006.01)
*H04L 29/12* (2006.01)
*H04W 88/18* (2009.01)
*H04W 84/12* (2009.01)
*H04W 88/16* (2009.01)

(52) U.S. Cl.
CPC ....... *H04W 36/0027* (2013.01); *H04W 76/15* (2018.02); *H04W 76/22* (2018.02); *H04W 84/12* (2013.01); *H04W 88/16* (2013.01); *H04W 88/182* (2013.01)

(56) References Cited

U.S. PATENT DOCUMENTS

| | | | |
|---|---|---|---|
| 2012/0226802 A1* | 9/2012 | Wu | H04L 1/1825 709/224 |
| 2012/0236801 A1* | 9/2012 | Krishnaswamy | H04W 76/16 370/329 |
| 2015/0024677 A1* | 1/2015 | Gopal | H04B 7/2041 455/13.1 |
| 2015/0172964 A1* | 6/2015 | Huang | H04W 76/30 455/437 |
| 2015/0296415 A1* | 10/2015 | Ling | H04L 69/08 370/329 |
| 2017/0223148 A1* | 8/2017 | Roeland | H04L 12/66 |

* cited by examiner

ROUTING OF MPTCP SUBFLOWS

This application is a 371 of International Application No. PCT/SE2014/050912, filed Jul. 31, 2014, the disclosure of which is fully incorporated herein by reference.

TECHNICAL FIELD

The present disclosure relates to methods and devices for routing Multipath Transmission Control Protocol (MPTCP) subflows in the wireless accesses used for the MPTCP subflows when an MPTCP proxy is used.

BACKGROUND

Introduction to MPTCP

Regular Transmission Control Protocol (TCP) restricts communication to a single path per session, where a TCP session can be defined as "A logical end-to-end data communication link between two applications, using TCP as protocol". The Internet Engineering Task Force (IETF) is currently working on mechanisms that add the capability of simultaneously using multiple paths to a regular TCP session. The extensions to TCP, called "multi-path TCP" (MPTCP) are described in Request for Comments (RFC) 6824 "TCP Extensions for Multipath Operation with Multiple Addresses". Architectural guidelines for multipath TCP development have been published in RFC 6182. RFC 6182 defines "path" as "A sequence of links between a sender and a receiver, defined in this context by a source and destination address pair".

In many cases multiple paths exist between peers, e.g. in case one or both of the end-devices is multi-homed and/or has connectivity via more than one access technology. For example, in a Third Generation Partnership Project (3GPP) multi-access scenario, a device (3GPP User Equipment, UE) may be connected via both a 3GPP access (such as Global System for Mobile Communications, GSM, Enhanced Data rates for GSM Evolution, EDGE, Radio Access Network (GERAN), Universal Terrestrial Radio Access Network (UTRAN), or Evolved UTRAN (E-UTRAN)) and Wireless Local Area Network (WLAN) access simultaneously. The simultaneous use of these multiple paths for a TCP session would improve resource usage within the network, and improve user experience through higher throughput and improved resilience to network failure. The use of MPTCP over multiple accesses would allow the user traffic to be either routed only over one of the accesses or simultaneously over multiple accesses. It would also allow the traffic to be moved in a seamless fashion between accesses depending on coverage, radio link quality or other factors.

In regular TCP, one TCP session between two hosts corresponds to one TCP flow between those hosts, carried over a single path. In MPTCP, one TCP session between two hosts corresponds to one or more MPTCP subflows between those hosts, each carried over a path. A (sub)flow is defined by a 5-tuple (source address, source port, destination address, destination port, protocol). Thus, a TCP session accommodates a single TCP flow when regular TCP is used, and a TCP session accommodates one or more MPTCP subflows (possibly via different paths) when MPTCP is used.

As MPTCP will likely be introduced in an incremental way, there is a high risk that only one peer (also called host) supports MPTCP. To overcome this problem, an MPTCP proxy may be used. One use case may be that the MPTCP proxy is placed in the network of an operator, and that the MPTCP-capable peer is a UE controlled by the operator.

FIG. 1 illustrates the MPTCP proxy model. A single TCP session between host A and host B corresponds to one or more MPTCP subflows between host A and a proxy, and to one TCP flow between the proxy and host B. The proxy multiplexes the MPTCP subflows to a single TCP flow, and vice versa. MPTCP proxies defined by IETF in Internet-Draft "draft-hampel-mptcp-proxies-anchors".

Architecture

FIG. 2 describes a typical architecture when two different accesses are used. This is a simplified figure of the architecture described in 3GPP Technical Specification (TS) 23.401 and 3GPP TS 23.402. The figure mainly describes the user plane parts. Furthermore, the figure shows the Long Term Evolution (LTE) architecture in the 3GPP side but other examples includes Wideband Code Division Multiple Access (WCDMA)/High Speed Packet Access (HSPA). In this case the node corresponding to the shown eNB in the context of FIG. 2 would be a Radio Network Controller (RNC), or a combined NodeB/RNC.

The UE of FIG. 2 has a dual radio, one 3GPP radio (e.g. LTE or WCDMA/HSPA) and one WLAN radio. The LTE access network comprises a radio access network (RAN) comprising one or more evolved Node B (eNB), as well as a Core Network (CN) comprising i.a. a Serving Gateway (SGW). The AC (Access Controller) is an access router in the WLAN radio access network. The UE communicates with a peer, which is located in a Packet Data Network (PDN). One example of a PDN is the Internet. The access networks provide the UE a connection to the PDN. Such a PDN connection can be seen as a virtual (e.g. Internet Protocol, IP) tunnel between the UE and the PDN. The PDN GateWay (PGW) terminates the PDN connection.

Note that the architecture of FIG. 2 is a functional architecture. The implementer of this architecture may choose to co-locate several functions in one product, or split one function into several products.

Thus, a UE can attach to the 3GPP radio access, followed by an attachment to the WLAN radio access. The attachment procedure is described in 3GPP TS 23.401 (section 5.3.2) combined with the procedure described in 3GPP TS 23.402 (section 6.2/16.2).

IP Address Used by the Proxy

There are also different alternatives for which IP address the proxy may use towards the peer that is not MPTCP-capable. This could be either the address from the PDN connection over the LTE radio access, or the address from the PDN connection over the WLAN radio access, or a new address. In the latter case, the MPTCP proxy works as a Network Address Translator (NAT) for the MPTCP traffic.

Placement of the MPTCP Proxy in the Architecture

The concept of the MPTCP proxy can only work if the UE traffic is routed via a common point. The proxy can then be placed at that common point. There are several options for architectural placement of the proxy. One alternative is to place the proxy "beyond" or "after" the PGW, i.e. within the PDN. Such placement is described in IETF Internet-Draft "MPTCP proxies and anchors". Another alternative is to place the proxy in the PGW. Yet another alternative is to place the proxy "in front of" or "before" the PGW, e.g. in the SGW, in the eNB or in the AC. However, when the UE moves, its LTE radio connection may be handed over to a new cell. As a consequence, the UE may get served by a new eNB or a new SGW or both. If the proxy is placed in an eNB or a SGW, then a path of the TCP session is lost. The same problem arises when the UE moves and its WLAN radio connection is handed over to a new cell.

SUMMARY

It is an objective of the present disclosure to provide improved handling of MPTCP subflows of a radio device when said radio device is handed over, typically between two radio base stations, within one of the wireless accesses used for an MPTCP subflow.

According to an aspect of the present disclosure, there is provided a method performed in a source gateway which is logically positioned in a first wireless access network between a radio device and a first mobility anchor. The source gateway comprises a Multipath Transmission Control Protocol (MPTCP) proxy for a TCP flow between the radio device and a peer. The TCP flow comprises at least two subflows between the radio device and the source gateway. The subflows comprise a first subflow over the first wireless access network and a second subflow over a second wireless access network. The method comprises receiving uplink data of the second subflow from a second gateway logically positioned in the second wireless access network between the radio device and a second mobility anchor, and sending downlink data of the second subflow to said second gateway. The method also comprises moving the proxy from the source gateway to a target gateway logically positioned in the first wireless access network between the radio device and the first mobility anchor, as part of a handover of the radio device within the first wireless access network. The method also comprises, after having moved the proxy to the target gateway, forwarding downlink data of both the first and second subflows to the target gateway, and forwarding the received uplink data of the second subflow to the target gateway.

According to another aspect of the present disclosure, there is provided a source gateway configured for being logically positioned in a first wireless access network between a radio device and a first mobility anchor, and for comprising an MPTCP proxy for a TCP flow between the radio device and a peer, said TCP flow comprising at least two subflows between the radio device and the source gateway, the subflows comprising a first subflow over the first wireless access network and a second subflow over a second wireless access network. The source gateway comprises processor circuitry, and a storage unit storing instructions executable by said processor circuitry whereby said source gateway is operative to receive uplink data of the second subflow from a second gateway logically positioned in the second wireless access network between the radio device and a second mobility anchor, and send downlink data of the second subflow to said second gateway. The source gateway is also operative to move the proxy from the source gateway to a target gateway logically positioned in the first wireless access network between the radio device and the first mobility anchor as part of a handover of the radio device within the first wireless access network. The source gateway is also operative to, after having moved the proxy to the target gateway, forward downlink data of both the first and second subflows to the target gateway, and forward the received uplink data of the second subflow to the target gateway.

According to another aspect of the present disclosure, there is provided a method performed in a first gateway which is logically positioned in a first wireless access network between a radio device and a first mobility anchor. The first gateway comprises an MPTCP proxy for a TCP flow between the radio device and a peer. The TCP flow comprises at least two subflows between the radio device and the first gateway. The subflows comprise a first subflow over the first wireless access network and a second subflow over a second wireless access network. The method comprises receiving uplink data of the second subflow from a source gateway logically positioned in the second wireless access network between the radio device and a second mobility anchor, and sending downlink data of the second subflow to said source gateway. The method also comprises receiving instructions to discontinue communication with the source gateway and to set up communication with a target gateway logically positioned in the second wireless access network between the radio device and the second mobility anchor as part of a handover of the radio device within the second wireless access network. The method also comprises, after having received the instructions, receiving uplink data of the second subflow from the target gateway, and sending downlink data of the second subflow to said target gateway.

According to another aspect of the present disclosure, there is provided a first gateway configured for being logically positioned in a first wireless access network between a radio device and a first mobility anchor, and for comprising an MPTCP proxy for a TCP flow between the radio device and a peer, said TCP flow comprising at least two subflows between the radio device and the first gateway, the subflows comprising a first subflow over the first wireless access network and a second subflow over a second wireless access network. The first gateway comprises processor circuitry, and a storage unit storing instructions executable by said processor circuitry whereby said first gateway is operative to receive uplink data of the second subflow from a source gateway logically positioned in the second wireless access network between the radio device and a second mobility anchor, and send downlink data of the second subflow to said source gateway. The first gateway is also operative to receive instructions to discontinue communication with the source gateway and to set up communication with a target gateway logically positioned in the second wireless access network between the radio device and the second mobility anchor as part of a handover of the radio device within the second wireless access network. The first gateway is also operative to, after having received the instructions, receive uplink data of the second subflow from the target gateway, and send downlink data of the second subflow to said target gateway.

According to another aspect of the present disclosure, there is provided a method performed in a first gateway which is logically positioned in a first wireless access network between a radio device and a first mobility anchor. The first gateway comprises an MPTCP proxy for a TCP flow between the radio device and a peer. The TCP flow comprises at least two subflows between the radio device and the first gateway. The subflows comprise a first subflow over the first wireless access network and a second subflow over a second wireless access network. The method comprises receiving uplink data of the second subflow from a second gateway logically positioned in the second wireless access network between the radio device and a second mobility anchor, and sending downlink data of the second subflow to said second gateway. The method also comprises receiving uplink data of the first subflow from a source gateway logically positioned in the first wireless access network between the radio device and the first mobility anchor, and sending downlink data of the first subflow to said source gateway.

The method also comprises receiving instructions to discontinue communication with the source gateway and to set up communication with a target gateway logically positioned in the first wireless access network between the radio device and the first mobility anchor as part of a handover of the radio device within the first wireless access network. The method also comprises, after having received the instructions, receiving uplink data of the first subflow from the target gateway, and sending downlink data of the first subflow to said target gateway.

According to another aspect of the present disclosure, there is provided a first gateway configured for being logically positioned in a first wireless access network between a radio device and a first mobility anchor, and for comprising an MPTCP proxy for a TCP flow between the radio device and a peer, said TCP flow comprising at least two subflows between the radio device and the first gateway, the subflows comprising a first subflow over the first wireless access network and a second subflow over a second wireless access network. The first gateway comprises processor circuitry, and a storage unit storing instructions executable by said processor circuitry whereby said first gateway is operative to receive uplink data of the second subflow from a second gateway logically positioned in the second wireless access network between the radio device and a second mobility anchor, and send downlink data of the second subflow to said second gateway. The first gateway is also operative to receive uplink data of the first subflow from a source gateway logically positioned in the first wireless access network between the radio device and the first mobility anchor, and send downlink data of the first subflow to said source gateway. The first gateway is also operative to receive instructions to discontinue communication with the source gateway and to set up communication with a target gateway logically positioned in the first wireless access network between the radio device and the first mobility anchor as part of a handover of the radio device within the first wireless access network. The first gateway is also operative to, after having received the instructions, receive uplink data of the first subflow from the target gateway, and send downlink data of the first subflow to said target gateway.

According to another aspect of the present disclosure, there is provided a computer program product comprising computer-executable components for causing a gateway to perform an embodiment of a method of the present disclosure when the computer-executable components are run on processor circuitry comprised in the gateway.

According to another aspect of the present disclosure, there is provided a computer program comprising computer program code which is able to, when run on processor circuitry of a source gateway which is logically positioned in a first wireless access network between a radio device and a first mobility anchor, and which is comprising an MPTCP proxy for a TCP flow between the radio device and a peer, said TCP flow comprising at least two subflows between the radio device and the source gateway, the subflows comprising a first subflow over the first wireless access network and a second subflow over a second wireless access network, cause the source gateway to receive uplink data of the second subflow from a second gateway logically positioned in the second wireless access network between the radio device and a second mobility anchor, and send downlink data of the second subflow to said second gateway. The code is also able to cause the source gateway to move the proxy from the source gateway to a target gateway logically positioned in the first wireless access network between the radio device and the first mobility anchor as part of a handover of the radio device within the first wireless access network. The code is also able to cause the source gateway to, after having moved the proxy to the target gateway, forward downlink data of both the first and second subflows to the target gateway, and forward the received uplink data of the second subflow to the target gateway.

According to another aspect of the present disclosure, there is provided a computer program comprising computer program code which is able to, when run on processor circuitry of a first gateway which is logically positioned in a first wireless access network between a radio device and a first mobility anchor, and which is comprising an MPTCP proxy for a TCP flow between the radio device and a peer, said TCP flow comprising at least two subflows between the radio device and the source gateway, the subflows comprising a first subflow over the first wireless access network and a second subflow over a second wireless access network, cause the first gateway to receive uplink data of the second subflow from a source gateway logically positioned in the second wireless access network between the radio device and a second mobility anchor, and send downlink data of the second subflow to said source gateway. The code is also able to cause the first gateway to receive instructions to discontinue communication with the source gateway and to set up communication with a target gateway logically positioned in the second wireless access network between the radio device and the second mobility anchor as part of a handover of the radio device within the second wireless access network. The code is also able to cause the first gateway to, after having received the instructions, receive uplink data of the second subflow from the target gateway, and send downlink data of the second subflow to said target gateway.

According to another aspect of the present disclosure, there is provided a computer program comprising computer program code which is able to, when run on processor circuitry of a first gateway which is logically positioned in a first wireless access network between a radio device and a first mobility anchor, and which is comprising an MPTCP proxy for a TCP flow between the radio device and a peer, said TCP flow comprising at least two subflows between the radio device and the source gateway, the subflows comprising a first subflow over the first wireless access network and a second subflow over a second wireless access network, cause the first gateway to receive uplink data of the second subflow from a second gateway logically positioned in the second wireless access network between the radio device and a second mobility anchor, and send downlink data of the second subflow to said second gateway. The code is also able to cause the first gateway to receive uplink data of the first subflow from a source gateway logically positioned in the first wireless access network between the radio device and the first mobility anchor, and send downlink data of the first subflow to said source gateway. The code is also able to cause the first gateway to receive instructions to discontinue communication with the source gateway and to set up communication with a target gateway logically positioned in the first wireless access network between the radio device and the first mobility anchor as part of a handover of the radio device within the first wireless access network. The code is also able to cause the first gateway to, after having received the instructions, receive uplink data of the first subflow from the target gateway, and send downlink data of the first subflow to said target gateway. According to another aspect of the present disclosure, there is provided a computer program product comprising an embodiment of a computer program of the present disclosure and a computer readable means on which the computer program is stored.

It is an advantage of the aspects of the present disclosure, as set out above, that subflows of an MPTCP flow can be suitably re-routed when the radio device is handed over within one of the wireless accesses used for an MPTCP subflow, even though the MPTCP proxy is positioned within one of the accesses, i.e. in front of the mobility anchor e.g. a Packet Data Network (PDN) gateway (GW), a PGW, or corresponding network node, as seen from the radio device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

MPTCP may be used as a technology to enable routing of TCP flows over multiple accesses, without impacting the application layer in the radio device, e.g. User Equipment (UE). There are different options on the placement of an MPTCP proxy in the network. This disclosure focuses on placement of the proxy "below" or "in front of" the mobility anchor e.g. a PGW. A technical problem that then needs to be solved is how handovers will work when using an MPTCP proxy.

The present disclosure defines mechanisms on how the MPTP proxy service is continued when the radio device (e.g. UE) moves between radio cells and the proxy is placed in front of the mobility anchor (e.g. PGW), i.e. logically positioned between the radio device and the mobility anchor. Some example approaches are described in more detail below, including: moving of the proxy state between a source and a target network node, and re-routing of PDN connections to a non-moving proxy when a handover is made from a source to a target network node.

Figure 1:
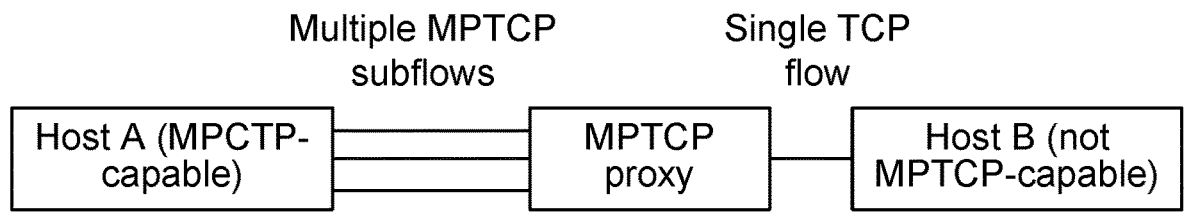
FIG. 1 schematically illustrates a TCP session with an MPTCP proxy, according to prior art.
Figure 2:
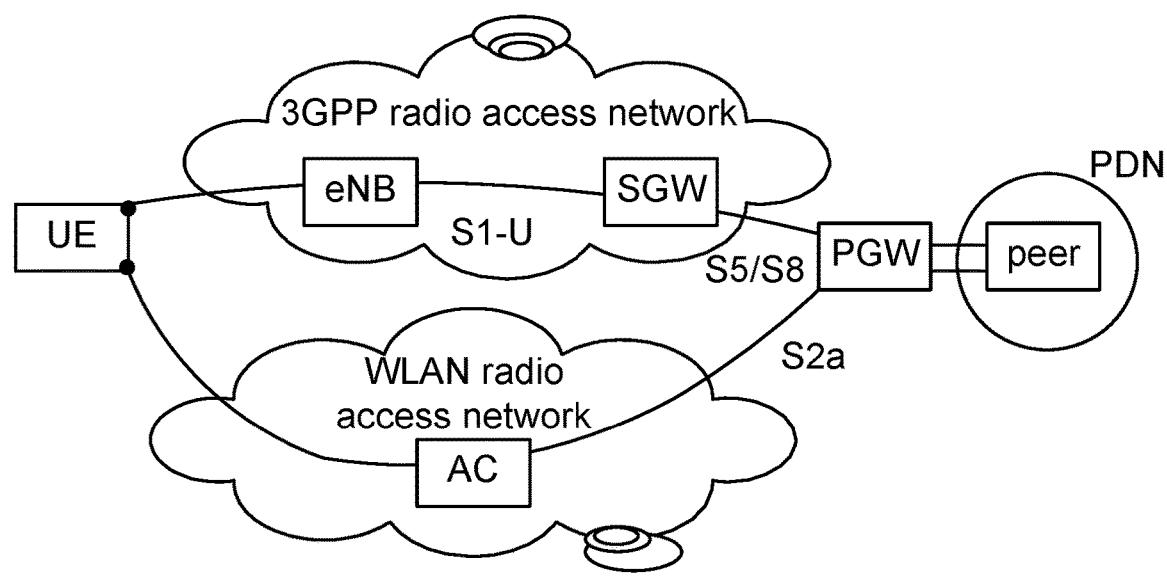
FIG. 2 schematically illustrates a TCP session over multiple radio accesses, according to prior art.
Figure 3:
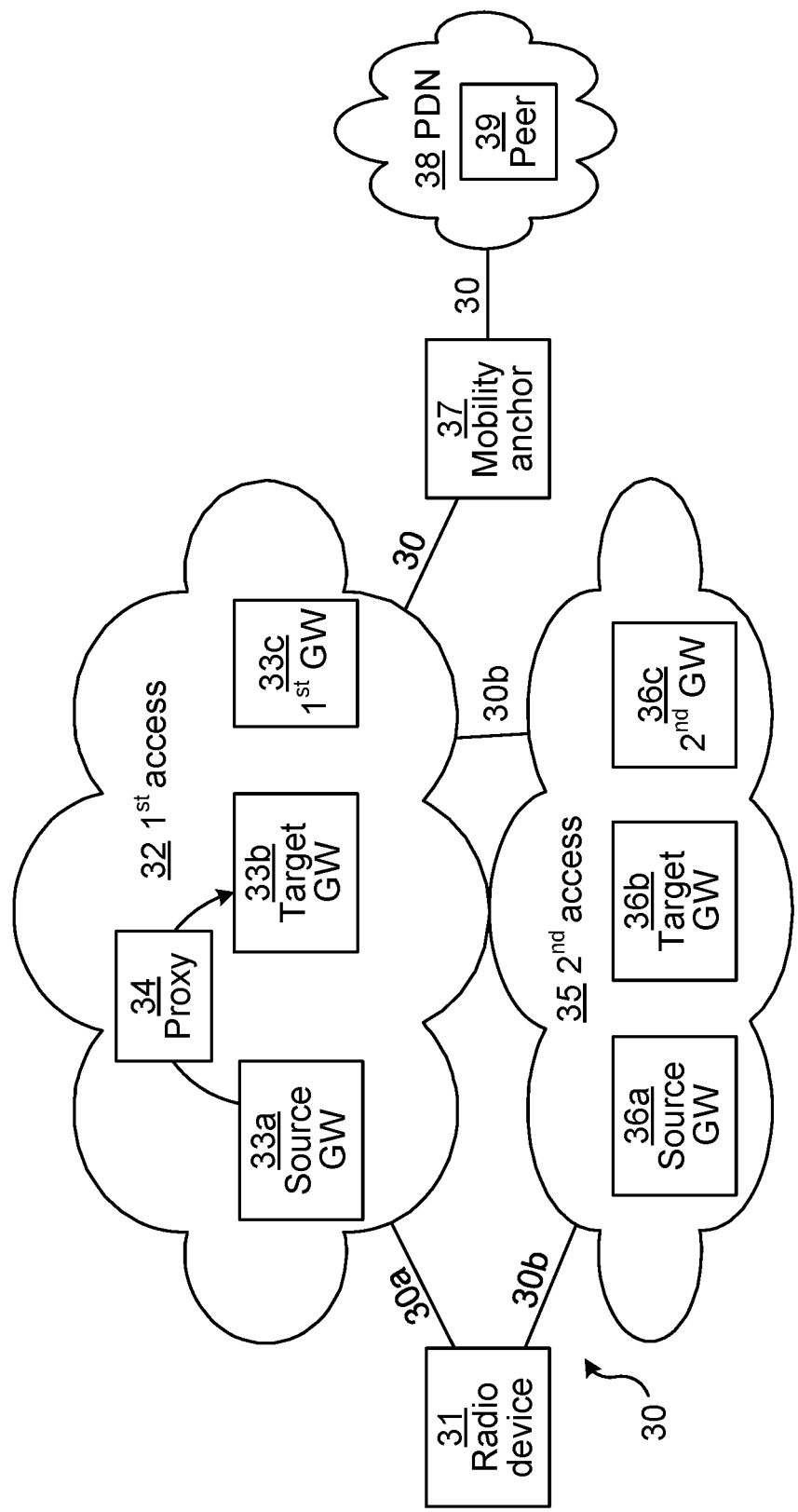
FIG. 3 is a schematic block diagram of an embodiment of a communication network, in accordance with the present disclosure.

FIG. 3 shows a communication network comprising two wireless access networks (herein also called "accesses"), a first access 32, e.g. a 3GPP access, and a second access 35, e.g. a WLAN access. A radio device 31 is able to connect to a peer 39 in a PDN 38 via both the first and second accesses and is also able to set up a TCP session over multiple paths for communication with the peer 39. The radio device may be any device or user equipment (UE), mobile or stationary, enabled to communicate over a radio cannel in a communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). Since the radio device is MPTCP capable, the TCP flow 30 of the TCP session is divided into a first subflow 30a over the first access 32 and a second subflow 30b over the second access 35. However, the peer 39 may not be MPTCP capable, or for some other reason it is not suitable to use MPTCP at the peer side of the communication. Thus, an MPTCP proxy 34 is used. In accordance with the present disclosure, the MPTCP proxy 34 is positioned within one of the accesses 32 or 35, between the radio device 31 and a mobility anchor 37 of each of the accesses. The mobility anchor may be the same for both accesses or a first mobility anchor 37 may be associated with the first access 32 and a second mobility anchor 37 may be associated with the second access 35. Between the mobility anchor 37 and the peer 39 in the PDN 38, the TCP session typically runs over a single path without the TCP flow being divided into several subflows, since an MPTCP proxy is used to combine the subflows somewhere within the first or second accesses. Each of the accesses 32 and 35 typically comprises a plurality of nodes, e.g. radio base stations and control nodes, such as eNB(s) and SGW(s) in an LTE access, Node B(s), RNC(s) and Serving General Packet Radio Service (GPRS) Support Node(s), SGSN(s), in a WCDMA access, or Access Point(s), AP(s), or Access Controller(s), AC(s), in a WLAN access. Also, other nodes e.g. defined by 3GPP such as a Trusted Wireless Access Gateway (TWAG) or an Evolved Packet Data Gateway (ePDG) may be included in any of the accesses 32 and 35. In FIG. 3, for illustrative purposes with the embodiments discussed below, the first access 32 comprises at least three nodes called gateways (GW) 33, a source GW 33a, a target GW 33b and a first GW 33c. Similarly, the second access 35 comprises at least three nodes called gateways (GW) 36, a source GW 36a, a target GW 36b and a second GW 36c. As will be further discussed below, any of these nodes/gateways 33 and 36 may comprise the proxy 34 and in some embodiments of the present disclosure the proxy is moved e.g. from a source gateway to a target gateway, e.g. from the source GW 33a to the target GW 33b as illustrated in FIG. 3. If, as in FIG. 3, the proxy resides in the first access 32, the combined TCP flow 30 runs between the first access and the mobility anchor 37, not between the second access and the mobility anchor.

Figure 4A:
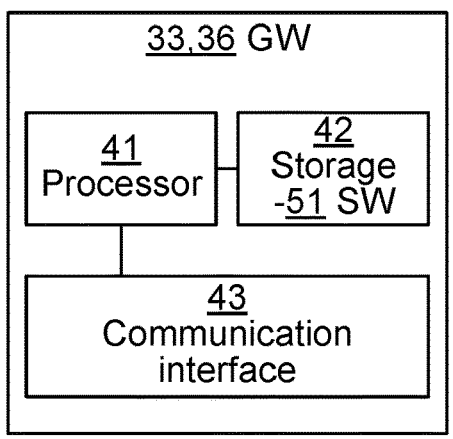
FIG. 4a is a schematic block diagram of an embodiment of a gateway, in accordance with the present disclosure.

FIG. 4a schematically illustrates an embodiment of any of the gateways 33 and 36. The gateways 33 or 36 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software (SW) 51 (see also FIG. 5) stored in a storage 42 of one or several storage unit(s) e.g. a memory. The storage unit is regarded as a computer readable means 52 (see FIG. 5) as discussed herein and may e.g. be in the form of a Random Access Memory (RAM), a Flash memory or other solid state memory, or a hard disk, or be a combination thereof. The processor circuitry 41 may also be configured to store data in the storage 42, as needed. The gateways 33 or 36 also comprises a communication interface 43 comprising a transmitter and a receiver, and possibly an antenna for wireless communication, for communication with e.g. the radio device 31 and the mobility anchor 37, and/or other nodes/gateways 33 and 36 in the accesses 32 and 35.

Thus, according to an aspect of the present disclosure, there is provided a source gateway 33a configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the source gateway, the subflows comprising a first subflow 30a over the first wireless access network and a second subflow 30b over a second wireless access network. The source gateway comprises processor circuitry 41, and a storage unit 42 storing instructions 51 executable by said processor circuitry whereby said source gateway 33a is operative to receive uplink data of the second subflow 30b from a second gateway 36c logically positioned in the second wireless access network 35 between the radio device and a second mobility anchor 37, and send downlink data of the second subflow to said second gateway. The source gateway is also operative to move the proxy 34 from the source gateway 33a to a target gateway 33b logically positioned in the first wireless access network between the radio device and the first mobility anchor as part of a handover of the radio device within the first wireless access network. The source gateway is also operative to, after having moved the proxy to the target gateway, forward downlink data of both the first and second subflows to the target gateway, and forward the received uplink data of the second subflow to the target gateway.

According to another aspect of the present disclosure, there is provided a first gateway 33c configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the first gateway, the subflows comprising a first subflow 30a over the first wireless access network and a second subflow 30b over a second wireless access network 35. The first gateway comprises processor circuitry 41, and a storage unit 42 storing instructions 51 executable by said processor circuitry whereby said first gateway 33c is operative to receive uplink data of the second subflow 30b from a source gateway 36a logically positioned in the second wireless access network between the radio device and a second mobility anchor 37, and send downlink data of the second subflow to said source gateway. The first gateway is also operative to receive instructions to discontinue communication with the source gateway 36a and to set up communication with a target gateway 36b logically positioned in the second wireless access network between the radio device and the second mobility anchor, as part of a handover of the radio device within the second wireless access network. The first gateway is also operative to, after having received the instructions, receive uplink data of the second subflow from the target gateway, and send downlink data of the second subflow to said target gateway.

According to another aspect of the present disclosure, there is provided a first gateway 33c configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the first gateway, the subflows comprising a first subflow 30a over the first wireless access network and a second subflow 30b over a second wireless access network 35. The first gateway comprises processor circuitry 41, and a storage unit 42 storing instructions 51 executable by said processor circuitry whereby said first gateway is operative to receive uplink data of the second subflow from a second gateway 36c logically positioned in the second wireless access network between the radio device and a second mobility anchor 37, and send downlink data of the second subflow to said second gateway. The first gateway is also operative to receive uplink data of the first subflow from a source gateway 33a logically positioned in the first wireless access network between the radio device and the first mobility anchor, and send downlink data of the first subflow to said source gateway. The first gateway is also operative to receive instructions to discontinue communication with the source gateway 33a and to set up communication with a target gateway 33b logically positioned in the first wireless access network between the radio device and the first mobility anchor, as part of a handover of the radio device within the first wireless access network. The first gateway is also operative to, after having received the instructions, receive uplink data of the first subflow from the target gateway, and send downlink data of the first subflow to said target gateway.

Figure 4B:
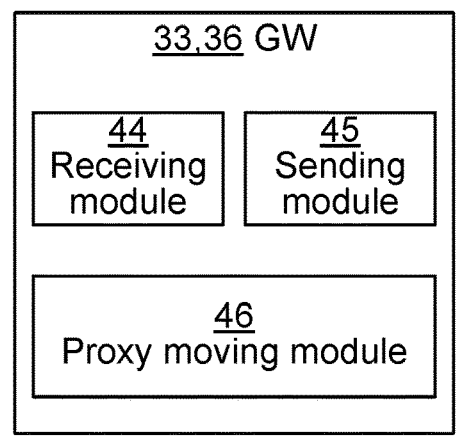
FIG. 4b is another schematic block diagram of an embodiment of a gateway, in accordance with the present disclosure.

FIG. 4b is a schematic block diagram illustrating an embodiment of the gateways 33 and 36, showing functional modules formed e.g. in the processor circuitry 41 of FIG. 4a. As previously mentioned, the processor circuitry 41 may run software 51 for enabling the gateway 33 or 36 to perform an embodiment of a method of the present disclosure, whereby functional modules may be formed in the gateway (e.g. the processor circuitry) for performing the different steps of the method. At least some of these modules are schematically illustrated as blocks within the gateway 33 or 36 in FIG. 4b. Thus, the gateway comprises a receiving module 44 for, typically in cooperation with the communication interface 43, receiving uplink and/or downlink data. The gateway also comprises a sending module 45 for, typically in cooperation with the communication interface 43, sending (e.g. forwarding) uplink and/or downlink data. In some embodiments of the present disclosure, the gateway 33 or 36 also comprises a proxy moving module 46 for moving the MPTCP proxy 34 from a source gateway to a target gateway.

Thus, according to an aspect of the present disclosure, there is provided a source gateway 33a configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the source gateway, the subflows comprising a first subflow 30a over the first wireless access network and a second subflow 30b over a second wireless access network. The source gateway 33a comprises means (e.g. the receiving module 44) for receiving uplink data of the second subflow from a second gateway 36c logically positioned in the second wireless access network between the radio device and a second mobility anchor 37, and means (e.g. the sending module 45) for sending downlink data of the second subflow to said second gateway. The source gateway 33a also comprises means (e.g. the proxy moving module 46) for moving the proxy from the source gateway to a target gateway 33b logically positioned in the first wireless access network between the radio device and the first mobility anchor, as part of a handover of the radio device within the first wireless access network. The source gateway 33a also comprises means (e.g. the sending module 45) for, after having moved the proxy to the target gateway, forwarding downlink data of both the first and second subflows to the target gateway, and forwarding the received uplink data of the second subflow to the target gateway.

According to another aspect of the present disclosure, there is provided a first gateway 33c configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the first gateway, the subflows comprising a first subflow 30a over the first wireless access network and a second subflow 30b over a second wireless access network 36. The first gateway comprises means (e.g. the receiving module 44) for receiving uplink data of the second subflow from a source gateway 36a logically positioned in the second wireless access network between the radio device and a second mobility anchor 37, and means (e.g. the sending module 45) for sending downlink data of the second subflow to said source gateway. The first gateway also comprises means (e.g. the receiving module 44) for receiving instructions to discontinue communication with the source gateway and to set up communication with a target gateway 36b logically positioned in the second wireless access network between the radio device and the second mobility anchor, as part of a handover of the radio device within the second wireless access network. The first gateway also comprises means (e.g. the receiving module 44) for, after having received the instructions, receiving uplink data of the second subflow from the target gateway, and means (e.g. the sending module 45) for sending downlink data of the second subflow to said target gateway.

According to another aspect of the present disclosure, there is provided a first gateway 33c configured for being logically positioned in a first wireless access network 32 between a radio device 31 and a first mobility anchor 37, and for comprising an MPTCP proxy 34 for a TCP flow 30 between the radio device and a peer 39, said TCP flow comprising at least two subflows between the radio device and the first gateway, the subflows comprising a first subflow 30a over the first wireless access network and a second subflow 30b over a second wireless access network 36. The first gateway comprises means (e.g. the receiving module 44) for receiving uplink data of the second subflow from a second gateway 36c logically positioned in the second wireless access network between the radio device and a second mobility anchor 37, and means (e.g. the sending module 45) for sending downlink data of the second subflow to said second gateway. The first gateway also comprises means (e.g. the receiving module 44) for receiving uplink data of the first subflow from a source gateway 33a logically positioned in the first wireless access network between the radio device and the first mobility anchor, and means (e.g. the sending module 45) for sending downlink data of the first subflow to said source gateway. The first gateway also comprises means (e.g. the receiving module 44) for receiving instructions to discontinue communication with the source gateway and to set up communication with a target gateway 33b logically positioned in the first wireless access network between the radio device and the first mobility anchor, as part of a handover of the radio device within the first wireless access network. The first gateway also comprises means (e.g. the receiving module 44) for, after having received the instructions, receiving uplink data of the first subflow from the target gateway, and means (e.g. the sending module 45) for sending downlink data of the first subflow to said target gateway.

Figure 5:
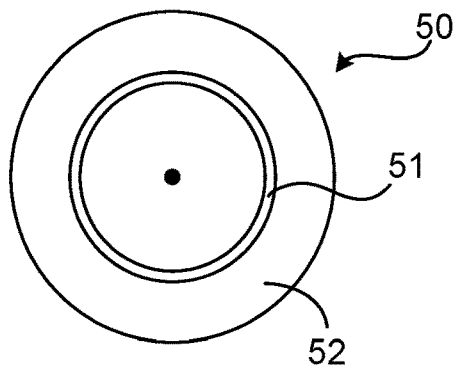
FIG. 5 schematically illustrates an embodiment of a computer program product of the present disclosure.

FIG. 5 illustrates a computer program product 50 of the present disclosure. The computer program product 50 comprises a computer readable medium 52 comprising a computer program 51 in the form of computer-executable components 51. The computer program/computer-executable components 51 may be configured to cause a gateway 33 or 36, e.g. as discussed herein, to perform an embodiment of a method of the present disclosure. The computer program/computer-executable components may be run on the processor circuitry 41 of the gateway for causing the gateway to perform the method. The computer program product 50 may e.g. be comprised in a storage unit or memory 42 comprised in the gateway and associated with the processor circuitry 41. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

Figure 6A:
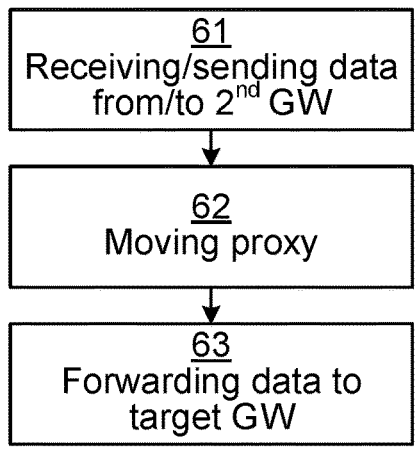
FIG. 6a is a schematic flow chart of an embodiment of a method of the present disclosure.

FIG. 6a is a schematic flow chart of an embodiment of a method of the present disclosure. The method is performed in a source gateway 33a which is logically positioned in a first wireless access network 32 between a radio device 31 and a first mobility anchor 37. The source gateway comprises an MPTCP proxy 34 for a TCP flow 30 between the radio device and a peer 39. The TCP flow comprises at least two subflows between the radio device and the source gateway. The subflows comprise a first subflow 30a over the first wireless access network and a second subflow 30b over a second wireless access network 35. The source gateway 33a in a start state 61 receives uplink data of the second subflow from a second gateway 36c logically positioned in the second wireless access network between the radio device and a second mobility anchor 37, and sends downlink data of the second subflow to said second gateway. Then, the source gateway moves 62 the proxy from the source gateway to a target gateway 33b logically positioned in the first wireless access network between the radio device and the first mobility anchor, as part of a handover of the radio device within the first wireless access network. Then, after having moved 62 the proxy to the target gateway, the source gateway in an updated state 63 forwards downlink data of both the first and second subflows to the target gateway, and forwards the received 61 uplink data of the second subflow to the target gateway.

Figure 6B:
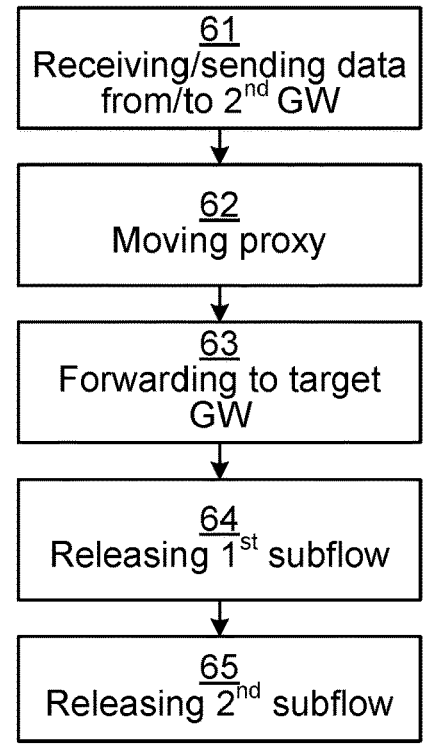
FIG. 6b is a schematic flow chart of another embodiment of a method of the present disclosure.

FIG. 6b is a schematic flow chart of another embodiment of a method of the present disclosure. The embodiment is as disclosed in respect of FIG. 6a, with the additional steps of the source gateway 33a releasing 64 resources for the first subflow 30a, whereby the forwarding 63 of data of the first subflow is discontinued, and/or releasing 65 resources for the second subflow 30b, whereby the forwarding 63 of data of the second subflow is discontinued, after the source gateway no longer receives uplink data from the second gateway (possibly due to the second gateway 36c having received a Path Switch Request as shown in many of the signalling diagrams enclosed with the present disclosure).

Figure 7:
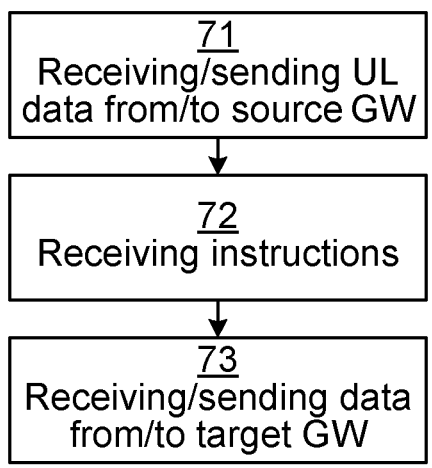
FIG. 7 is a schematic flow chart of another embodiment of a method of the present disclosure.

FIG. 7 is a schematic flow chart of another embodiment of a method of the present disclosure. The method is performed in a first gateway 33c which is logically positioned in a first wireless access network 32 between a radio device 31 and a first mobility anchor 37. The first gateway comprises an MPTCP proxy 34 for a TCP flow 30 between the radio device and a peer 39. The TCP flow comprises at least two subflows between the radio device and the first gateway. The subflows comprise a first subflow 30a over the first wireless access network and a second subflow 30b over a second wireless access network 35. The first gateway in a start state 71 receives uplink data of the second subflow from a source gateway 36a logically positioned in the second wireless access network between the radio device and a second mobility anchor 37, and sends 71 downlink data of the second subflow to said source gateway. Then the first gateway receives 72 instructions (possibly a Path Switch Request as shown in many of the signalling diagrams enclosed with the present disclosure) to discontinue communication with the source gateway and to set up communication with a target gateway 36b logically positioned in the second wireless access network between the radio device and the second mobility anchor, as part of a handover of the radio device within the second wireless access network. Then the first gateway, after having received 72 the instructions, in an updated state 73 receives 73 uplink data of the second subflow from the target gateway, and sends 73 downlink data of the second subflow to said target gateway.

Figure 8:
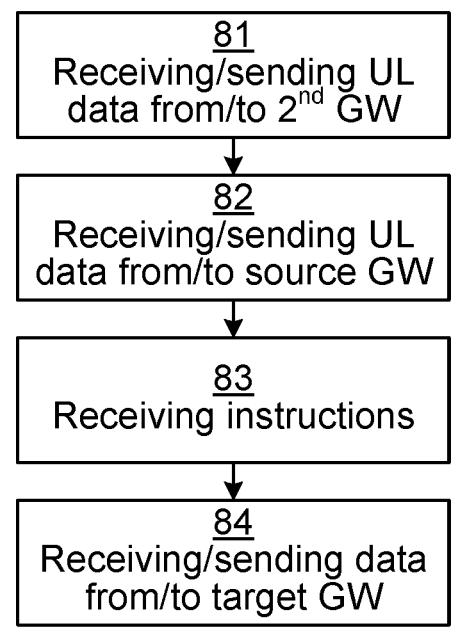
FIG. 8 is a schematic flow chart of another embodiment of a method of the present disclosure.

FIG. 8 is a schematic flow chart of another embodiment of a method of the present disclosure. The method is performed in a first gateway 33c which is logically positioned in a first wireless access network 32 between a radio device 31 and a first mobility anchor 37. The first gateway comprises an MPTCP proxy 34 for a TCP flow 30 between the radio device and a peer 39. The TCP flow comprises at least two subflows between the radio device and the first gateway. The subflows comprise a first subflow 30a over the first wireless access network and a second subflow 30b over a second wireless access network 35. The first gateway in a second subflow start state 81 receives uplink data of the second subflow from a second gateway 36c logically positioned in the second wireless access network between the radio device and a second mobility anchor 37, and sends 81 downlink data of the second subflow to said second gateway. Also, in a first subflow start state 82, the first gateway receives 82 uplink data of the first subflow from a source gateway 33a logically positioned in the first wireless access network between the radio device and the first mobility anchor, and sends 82 downlink data of the first subflow to said source gateway. Then, the first gateway receives 83 instructions (possibly a Path Switch Request as shown in many of the signalling diagrams enclosed with the present disclosure) to discontinue communication with the source gateway and to set up communication with a target gateway 33b logically positioned in the first wireless access network between the radio device and the first mobility anchor as part of a handover of the radio device within the first wireless access network. Then, after having received (83) the instructions, the first gateway, in an updated state, receives 84 uplink data of the first subflow from the target gateway, and sends 84 downlink data of the first subflow to said target gateway.

Below follow presentations of some more specific embodiments, which are i.a. relevant to any of the more general method embodiments presented in FIGS. 6a, 6b, 7 and 8. In some embodiments of the present disclosure, the first wireless access network 32 is a cellular communication network in accordance with a Third Generation Partnership Project (3GPP) communication standard. In some embodiments, the source gateway 33a, the target gateway 33b and/or the first gateway 33c is comprised in a radio access network (RAN) node, e.g. a base station such as an evolved Node B (eNB) or a Radio Network Controller (RNC), or in a Core Network (CN) node such as a Serving Gateway (SGW) or a Serving GPRS support node (SGSN). The second wireless access network 35 may e.g. be another 3GPP access or a WLAN access.

In some other embodiments of the present disclosure, the first wireless access network 32 is a Wireless Local Area Network (WLAN). In some embodiments, the source gateway 33*a*, the target gateway 33*b* and/or the first gateway 33*c* is comprised in a WLAN node e.g. an Access Point (AP) or an Access Controller (AC), or in a Trusted Wireless Access Gateway (TWAG) or an Evolved Packet Data Gateway (ePDG) as defined by 3GPP. The second wireless access network 35 may e.g. be a 3GPP access or another WLAN access.

In some embodiments of the present disclosure, the first and/or the second mobility anchor 37 is comprised in a PDN gateway (PGW).

In some embodiments of the present disclosure, the second mobility anchor 37 is co-located with, or the same as, the first mobility anchor 37.

In some embodiments of the present disclosure, the proxy 34 acts as a Network Address Translator (NAT) whereby the TCP flow 30 between the proxy and the peer 39 uses an Internet Protocol (IP) address different from IP addresses used in either of the first and second subflows 30*a* and 30*b*.

Below, example embodiments of the present disclosure are presented in numerous signalling diagrams (herein also called call flows). There is generally assumed to be three IP connections, a first access IP connection for the subflow over the first access 32, a second access IP connection for the subflow over the second access 35, and a proxy IP connection for the TCP flow 30 between the proxy and the PGW or PDN/peer. The call flows assume that GPRS Tunnelling Protocol (GTP) is used as tunnelling protocol. The same principles apply if another tunnelling protocol, e.g. Proxy Mobile IPv6 (PMIP), is used. The proxy may be found by the radio device 31 when performing initial attach. In the following subsections, it is assumed that the UE already has done an initial attach over both its accesses (e.g. 3GPP radio and WLAN radio). Either complete PDN connections are routed through the proxy 34, or the network breaks out MPTCP traffic from a PDN connection to the proxy. In addition, the described examples apply also for the case when the 3GPP RAN side is UTRAN. In this case the node corresponding to the eNB is the RNC (or a combined RNC and NodeB) and the proxy 34 could be placed in the RNC (or in the combined RNC and NodeB). There are also different options in how the UTRAN is connected to the core network. Two examples are using the Iu-PS interface between the Radio Network Subsystem (RNS)/RNC and SGSN, or using the S12 interface between the RNS/RNC and the SGW in case of Direct Tunnel and when the core network is an Evolved Packet Core (EPC). In a similar way, the described examples also apply for the case when Inter-Radio Access Technology (RAT) handovers takes place in the 3GPP side, for example when the UE 31 moves between WCDMA/HSPA/UTRAN and LTE/E-UTRAN. Also in these cases, the MPTCP proxy 34 can be either kept in the location before the handover or it can be moved to the new target radio access node controlling the UE after the handover, e.g. an eNodeB or a RNC.

EXAMPLE 1

Figure 9A:
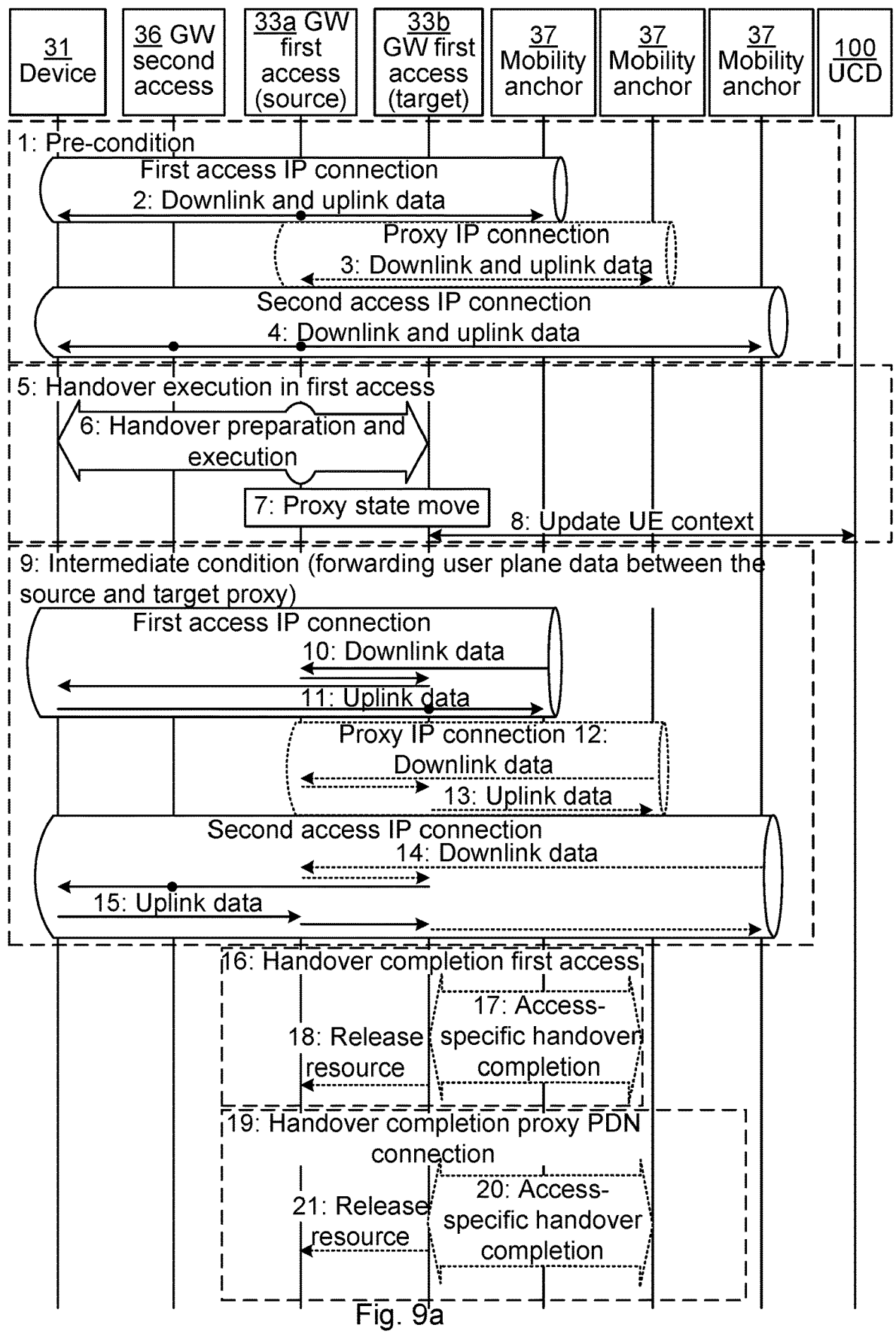
FIG. 9 is a schematic signalling diagram illustrating embodiments of a method of the present disclosure.
Figure 9B:
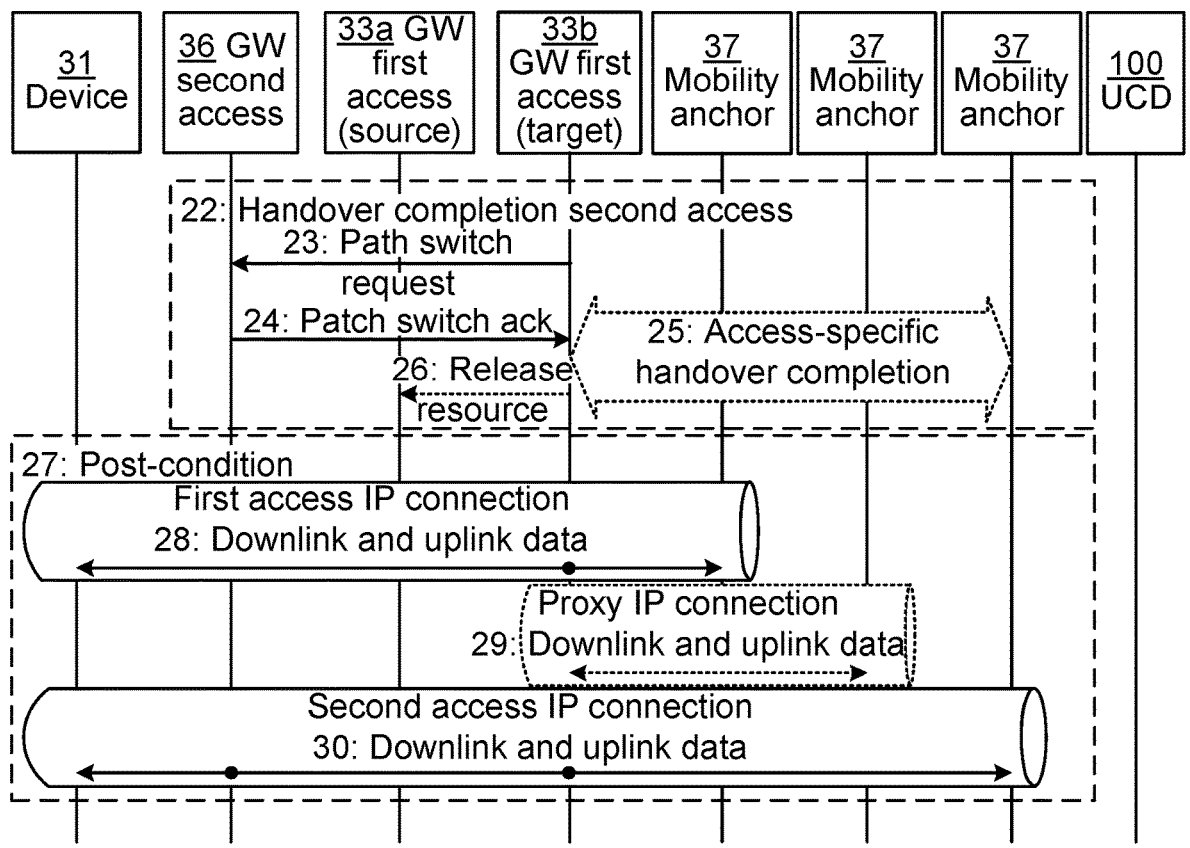

FIG. 9 is a general example of a call flow when a handover of the radio device 31 within the first access (typically between two radio base stations) results in the move of the proxy 34 from a source gateway 33*a* to a target gateway 33*b* in said first access. It is noted that, in addition to the proxy ("proxy state") being moved from the source GW 33*a* to the target GW 33*b*, handover completion is performed for all IP connections that the proxy is involved in. In a prior art handover, there would only be a handover completion for a single IP connection. Also, a Path Switch Request is sent from the target GW 33*b* to the second GW 36*c* in order to instruct the second GW 36*c* to forward uplink data of the second subflow 30*b* to the target GW instead of to the source GW.

EXAMPLE 2

Figure 10:
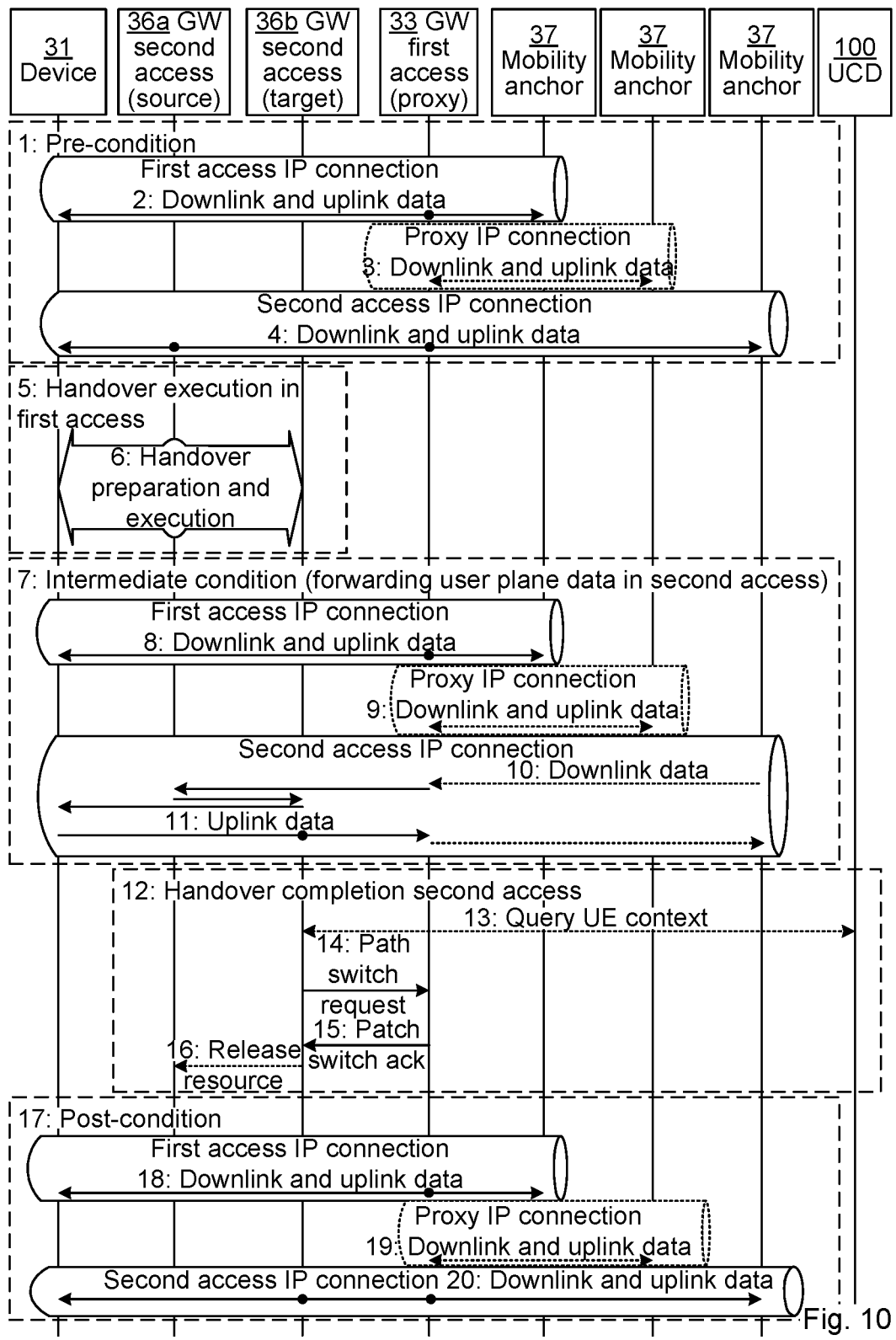
FIG. 10 is a schematic signalling diagram illustrating other embodiments of a method of the present disclosure.

FIG. 10 is a general example of a call flow when a handover of the radio device is performed in the second access 35, why the MPTCP proxy 34 in the first gateway 33*c* does not have to move, but rather changes from communicating with the source GW 36*a* to the target GW 36*b* of the second access 35 regarding the second subflow 30*b*. It is noted that the first GW 33*c* receives a Path Switch Request from the target GW 36*b*, whereby the first GW 33*c* is instructed to forward downlink data to the target GW 36*b* instead of the source GW 36*a* regarding the second subflow 30*b*.

EXAMPLE 3

Figure 11:
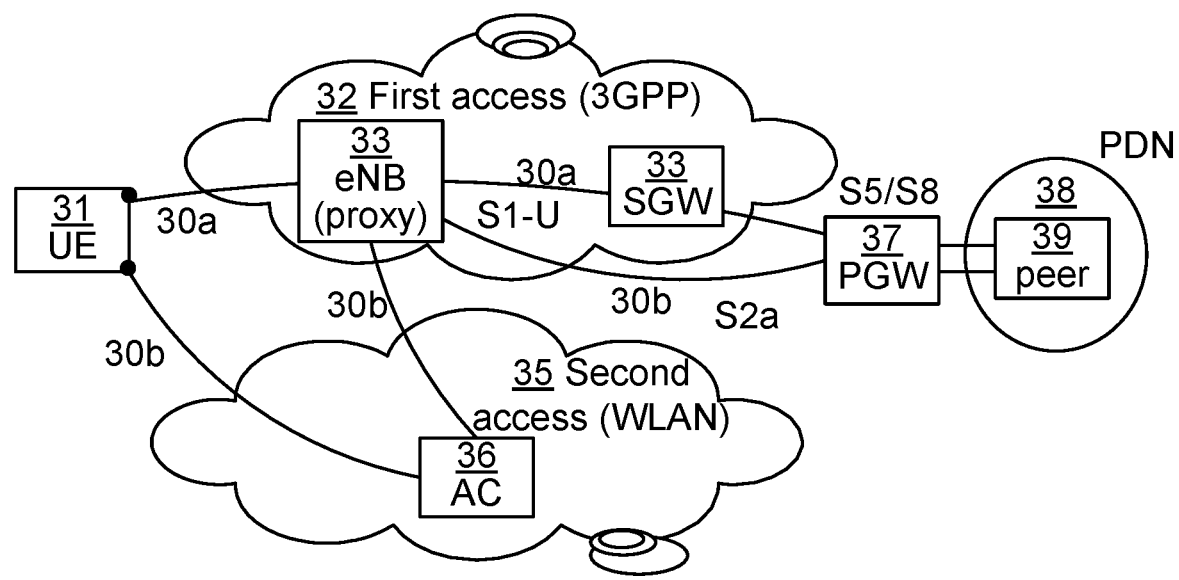
FIG. 11 is a schematic block diagram of an example embodiment of a communication network, in accordance with the present disclosure.

FIG. 11 shows an architecture where the proxy 34 is located in a serving eNB (serving the radio device 31) in the first access 32, being an LTE access. As can be seen, the data of the second subflow 30*b* is sent between the serving AC of the second access 35 and the serving eNB comprising the proxy 34.

Figure 12A:
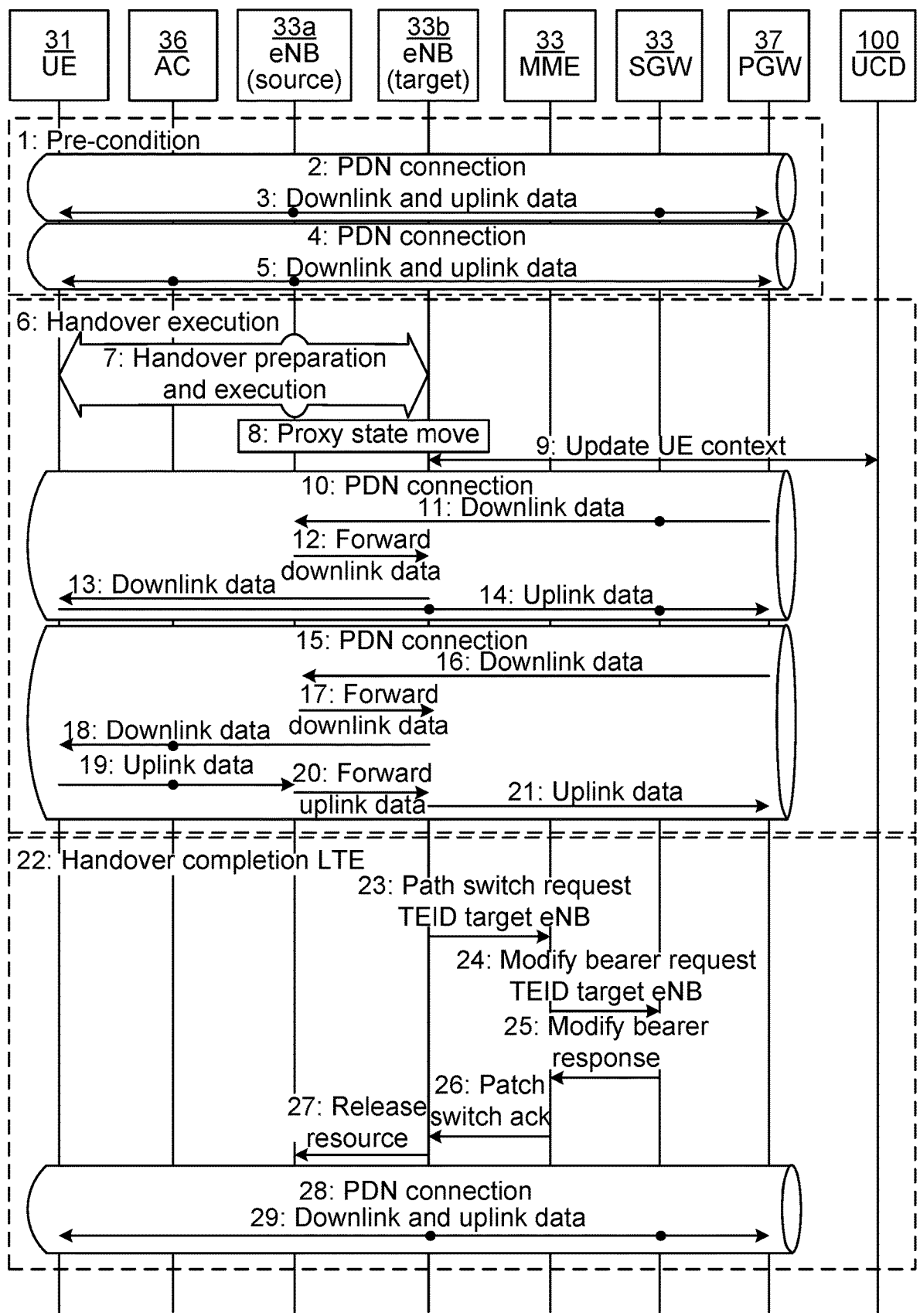
FIG. 12 is a schematic signalling diagram illustrating an example embodiment of a method of the present disclosure.
Figure 12B:
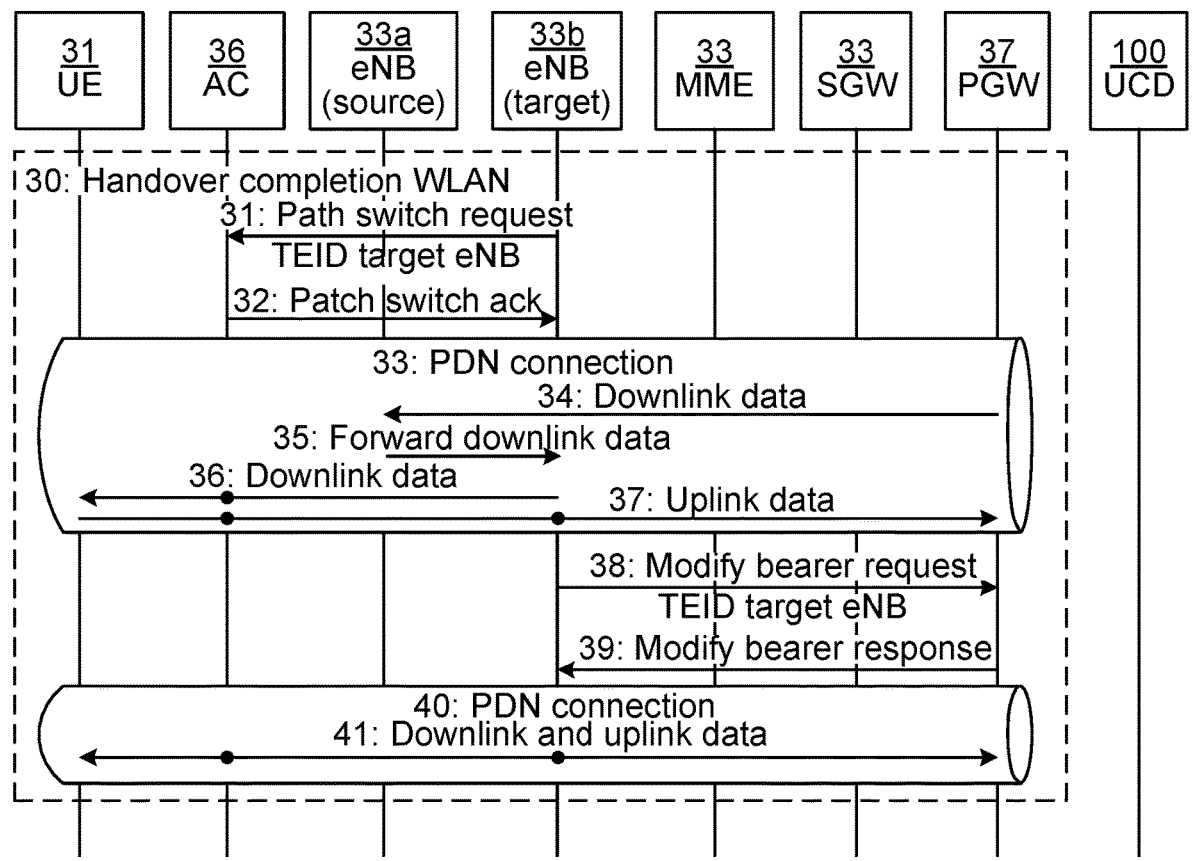

FIG. 12 shows a more detailed example call flow of the embodiment of Example 1, when there is a handover in LTE access 32. As part of the handover procedure, the UE 31 gets attached to a new eNB. This solution variant assumes that the proxy, placed in the eNB, either uses the first or second subflow address towards the peer 39 that is not MPTCP-capable (i.e. the proxy is not a NAT). It also assumes that entire PDN connections are routed through the proxy.

For the handover of the LTE PDN connection, this call flow simply follows the existing specification. This particular call flow is for simplicity based on the X2-based handover without SGW relation (see section 5.5 in 3GPP TS 23.401). It is noted that the proxy state is moved 62 and that the WLAN PDN connection is handed over.

The moving of the proxy state is captured in step 8 and 9 of the call flow. In step 8, the internal MPTCP proxy state for all subflows of this UE routed via the LTE or WLAN PDN connection is moved. This may include buffers, counters, keying material, etc. In this LTE-handover case the information related to MPTCP proxy state may be moved either using the X2AP signalling messages over the X2-interface in the case of X2-based handover or via the core network using the RAN Transparent signalling containers transported using the SiAP signalling messages over the S1-interfaces. The RAN transparent signalling containers can also be used in the case of 3GPP Inter-RAN handovers, e.g. between LTE/E-UTRAN and WCDMA/HSPA/UTRAN. Step 9 updates the User Context Database (UCD) 100 with the new location of the proxy for this UE 31. Block 10 indicates how the WLAN PDN connection is routed at that point of time. The proxy 34 is already moved to the target eNB 33*b*. However, the SGW is not yet aware of this, so downlink data will be sent from SGW to the source eNB 33a. The source eNB will therefore forward this data to the target eNB. The target eNB knows that a handover has just been made (step 7/8) and knows by that the identity of the AC 36c. It will therefore send the downlink data to the AC. In the other direction, the AC does not know yet that the proxy has moved, and still keeps on sending uplink data to the source eNB. That one will forward the uplink data to the target eNB.

In steps 31-32, the target eNB 33b informs the AC 36c to send uplink data to the target eNB instead of the source eNB 33a. E.g, when GTP-U is used to carry data between AC and eNB, then the target eNB would provide a new Tunnel Endpoint Identifier (TEID) for uplink user plane data. In steps 38-39, the target eNB informs the PGW 37 to send downlink data to the target eNB instead of the source eNB. The call flow shows an example where GTP-U is used between eNB and PGW. The target eNB then provides a new TEID for downlink user plane data.

The order in which block 22 and block are performed may not be relevant. These blocks may also be performed in parallel. Likewise, within block 30, the order in which steps 31-32 and steps 38-39 are performed may not be relevant, and may be performed in parallel.

EXAMPLE 4

Figure 13:
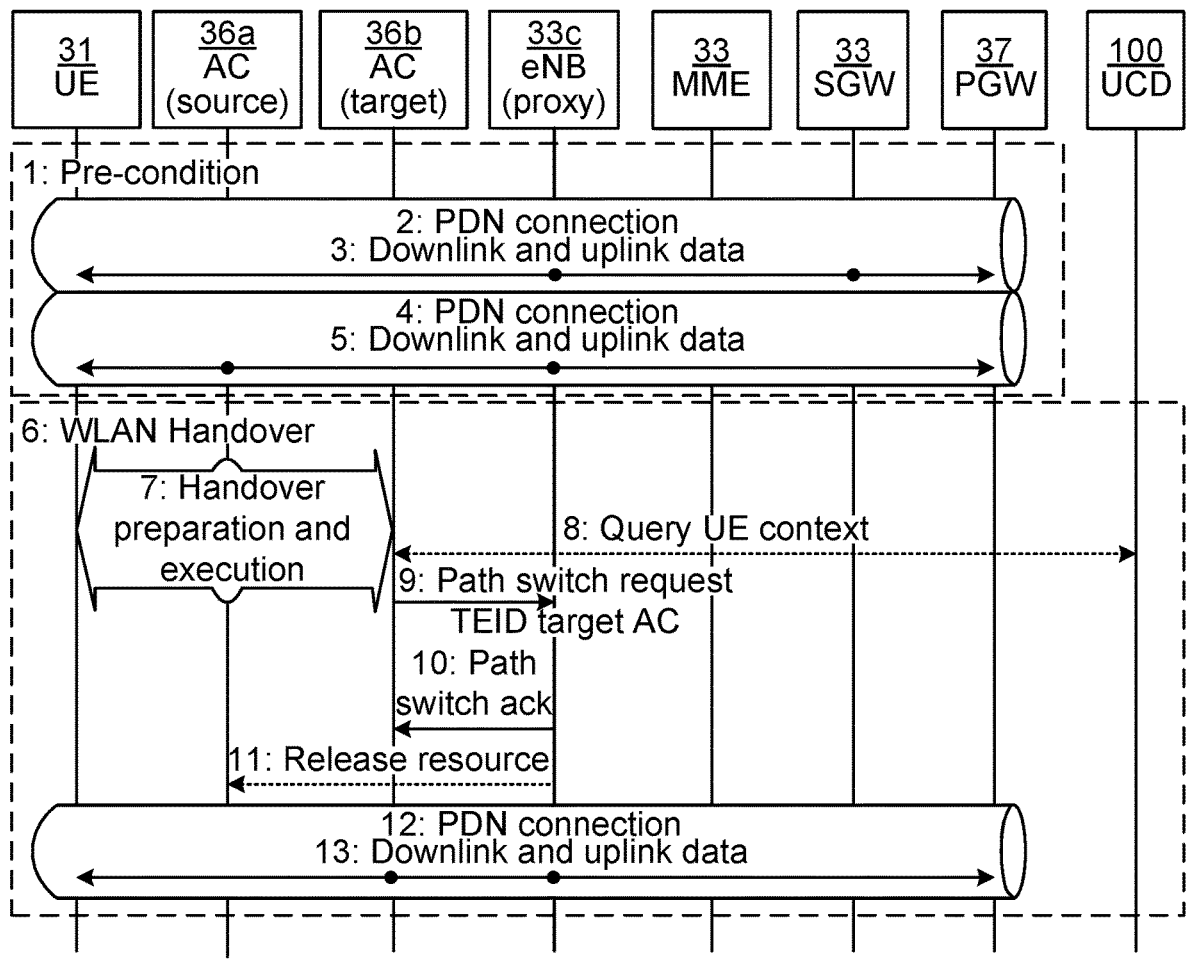
FIG. 13 is a schematic signalling diagram illustrating another example embodiment of a method of the present disclosure.

FIG. 13 shows a more detailed example call flow of the embodiment of Example 2, when there is a handover in WLAN access 35. The call flow describes the case when the proxy 34 is co-located in an eNB 33c and a handover is performed on the UE's WLAN radio access 35. As part of the handover procedure the UE 31 gets attached to a target AC 36b.

As the proxy 34 does not move in this call flow, the proxy state and the LTE PDN connection do not need to be moved. The WLAN-to-WLAN handover preparation and execution is done in block 6. WLAN-to-WLAN handovers are not specified by 3GPP. Step 7 could be achieved by signalling between source and target AC, where the UE is completely unaware of the handover. Alternatively, the UE sends, as part of step 7, an attach request with a handover indication to the target AC 36b. In the former case, the target AC may learn the address of the proxy from the source AC 36a. Step 8 is then not needed and therefore indicated as optional by a dashed line. In the latter case, the target AC queries the UCD in order to find the correct proxy location.

In steps 9-10, the target AC informs the eNB 33c to send downlink data to the target AC instead of the source AC. For example, GTP-U is used between AC and eNB. The target AC then provides a new TEID for downlink user plane data.

In the optional step 11, the eNB may inform the source AC to clean up resources. This is in particular relevant if there was no signalling between source and target AC in step 7. In that case, the target AC needs a means to find the source AC. Either the UCD may be used to store the identity of the AC. This would need to be done when the red PDN connection is setup. Alternatively, the proxy stores the identity of the AC when the PDN connection is setup. The target AC may then retrieve the identity of the source AC as part of steps 9-10.

EXAMPLE 5

In examples 3 and 4, it was assumed that the PDN connections are routed via the proxy. An alternative would be to let the network break out MPTCP traffic from the PDN connection to the proxy.

As the proxy 34 is assumed to be co-located in the eNB 33, the break-out will only need to be performed on the AC 36 in the WLAN access network. Two different sub-cases are described, handover on LTE radio (Example 5) and handover on WLAN radio (Example 6).

Figure 14A:
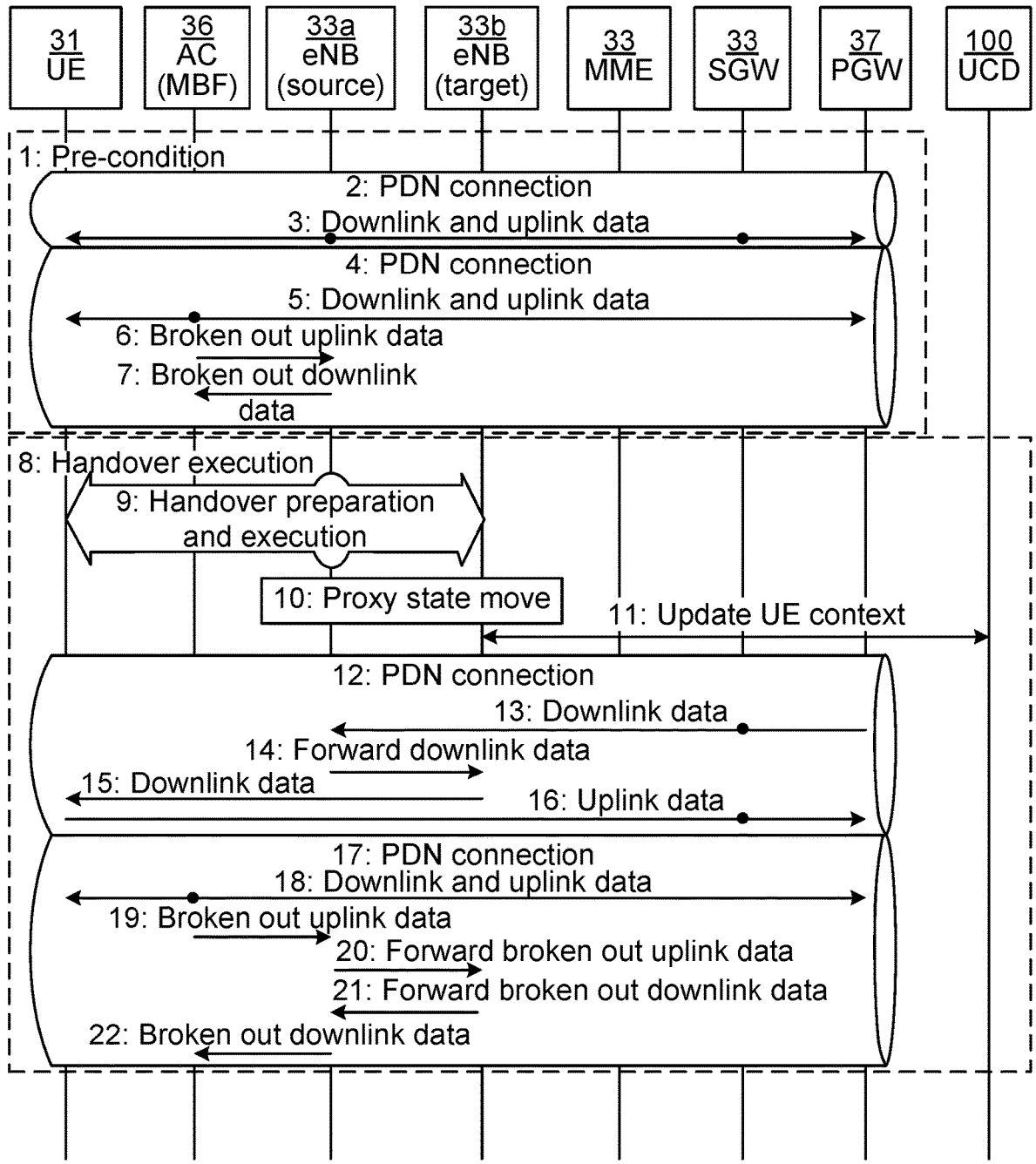
FIG. 14 is a schematic signalling diagram illustrating another example embodiment of a method of the present disclosure.
Figure 14B:
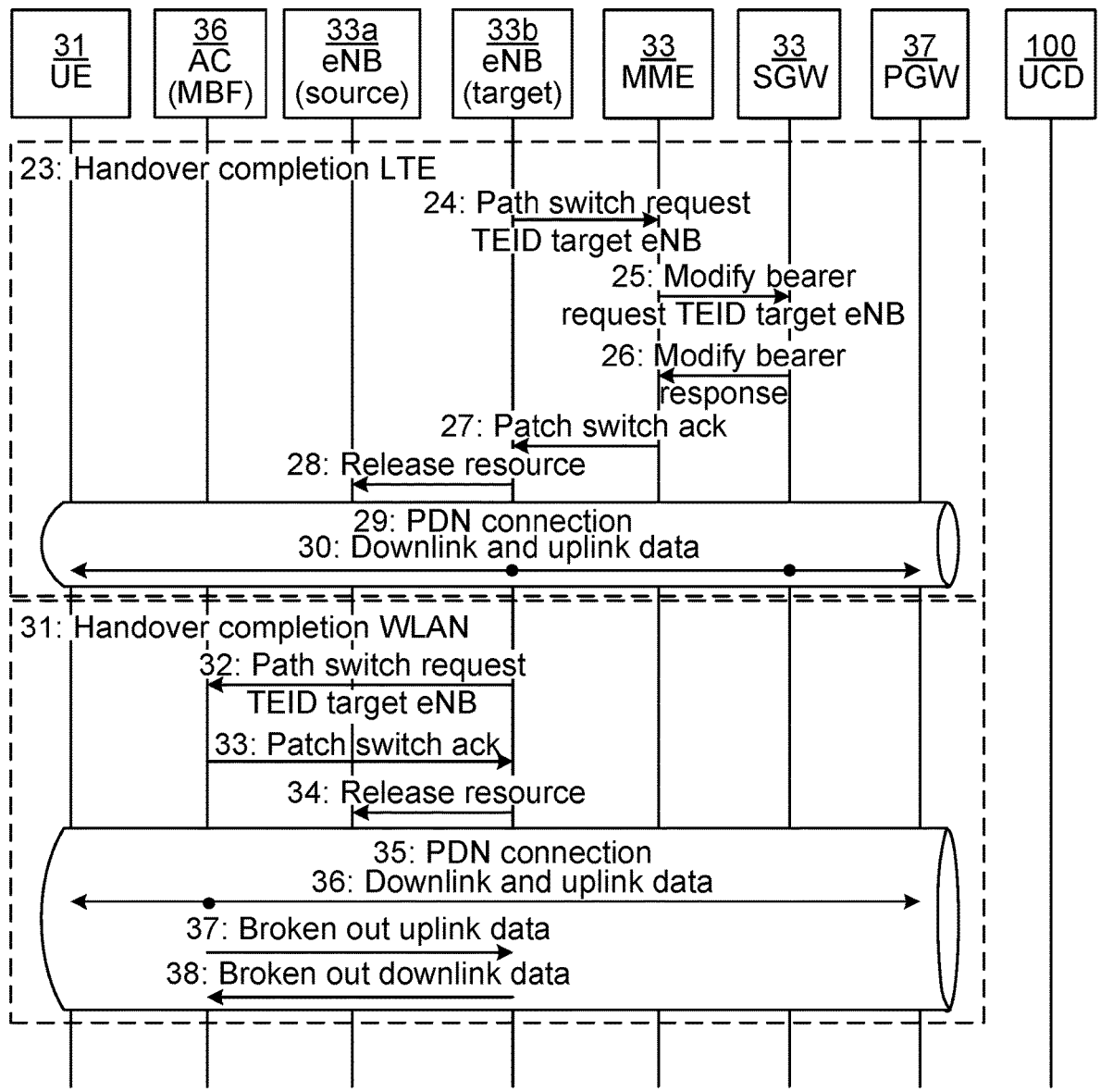

FIG. 14 shows the call flow example (a more detailed embodiment of the embodiment of Example 1) for handover in the first access 32 (LTE). The AC 36c includes the MPTCP break-out function (MBF). A difference with the call flow in Example 3 is that the PDN connection is not routed via the eNB/proxy. Therefore, the handover completion for WLAN, block 31, is different.

Just after the handover execution and proxy state move (step 9-10), the source eNB/proxy may forward uplink broken out data to the target eNB/proxy, and vice versa for the downlink. This is shown in block 17.

EXAMPLE 6

Figure 15:
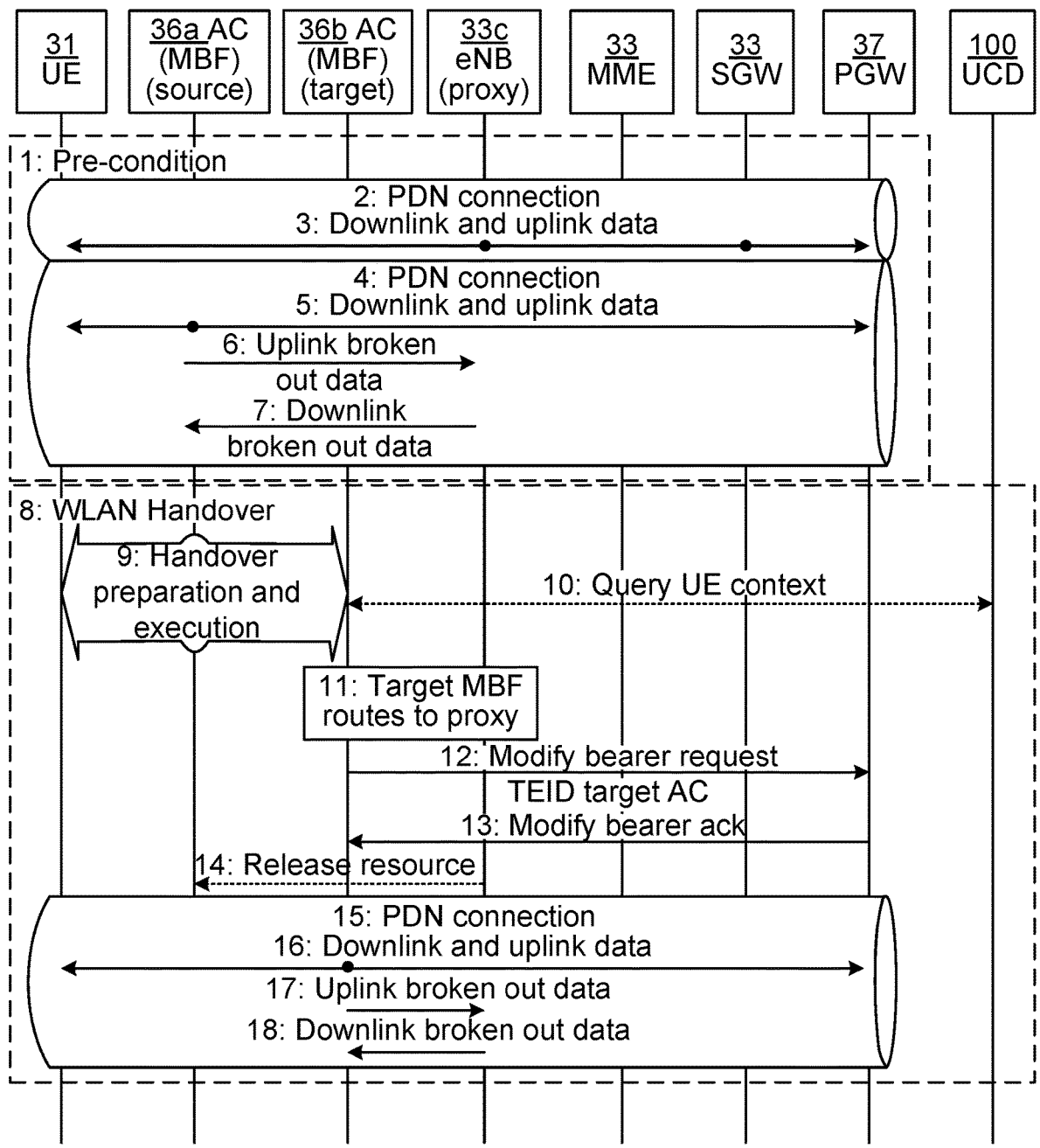
FIG. 15 is a schematic signalling diagram illustrating another example embodiment of a method of the present disclosure.

FIG. 15 shows a more specific embodiment of the embodiment of Example 2, where handover is performed in the second access 35 (WLAN). A difference to the call flow in Example 4 is that the second subflow 30b PDN connection is not routed via the eNB/proxy. In step 12-13, the second subflow PDN connection is handed over to the target AC 36b. The MBF in the target AC finds from step 9 or to that this PDN connection is being served by a particular proxy location. After step 11, the target AC serves as a break-out function to route MPTCP traffic to the eNB.

EXAMPLE 7

In examples 3 and 4, it was assumed that the MPTCP proxy either uses the IP address of the first or second subflows towards the peer 39 that is not MPTCP-capable. Assume the proxy 34 uses the IP address of the second subflow 30b. If the PDN connection of that address gets disconnected (e.g. due to a failed handover), then the PGW 37 would release the address. The proxy shall then no longer use the address either. This would mean a complete loss of all TCP flows 30 for this UE 31 going through the proxy. To overcome this problem, there are two solutions presented below:

1. All PDN connections that an MPTCP proxy 34 serves are prevented from being disconnected. In such a solution, it may not be possible to prevent a UE 31 from disconnecting a PDN connection (e.g. the UE may disconnect its WLAN PDN connection because it gets out-of-reach of WLAN). However, it is possible for the network to keep the PDN connection segment between proxy 34 and PGW 37 intact.

2. The proxy 34 uses a new address that is independent of other addresses. In such a solution, the proxy would set up a special PDN connection to the PGW 37. The endpoint of that PDN connection would be the proxy 34, not the UE 31.

The first solution direction could be seen as a subset of the second. Applying the first solution to the example above, would mean that the second subflow IP address would be transformed into a new address at the time of the disconnection. Therefore, the present disclosure only specifies the second solution direction in further detail.

If a new PDN connection (herein also called a combined or proxy PDN connection) is used by the proxy 34 to carry MPTCP traffic from a first and/or second subflow PDN connection, then either the first and/or second subflow PDN connections (herein also called first and second PDN connections) terminate in the PGW 37 or terminate in the proxy 34. In the former case, the peer 39 the UE 31 is communicating with may see multiple IP addresses from the UE. E.g. the peer may see a TCP flow 30 originating from the new address, and a UDP flow originating from an IP address also used by the first and/or second TCP subflow 30a/30b. If the first and/or second subflow PDN connections terminate in the proxy, then the proxy will act as a NAT for all traffic from the first and/or second subflow PDN connections. The peer will only see a single (the new) address. Now, we assume that the first and/or second subflow PDN connections terminate in the PGW 37 as this is the most generic variant. The variant where first and/or second subflow PDN connections terminate in the proxy 34 can be seen as a subset.

Figure 16A:
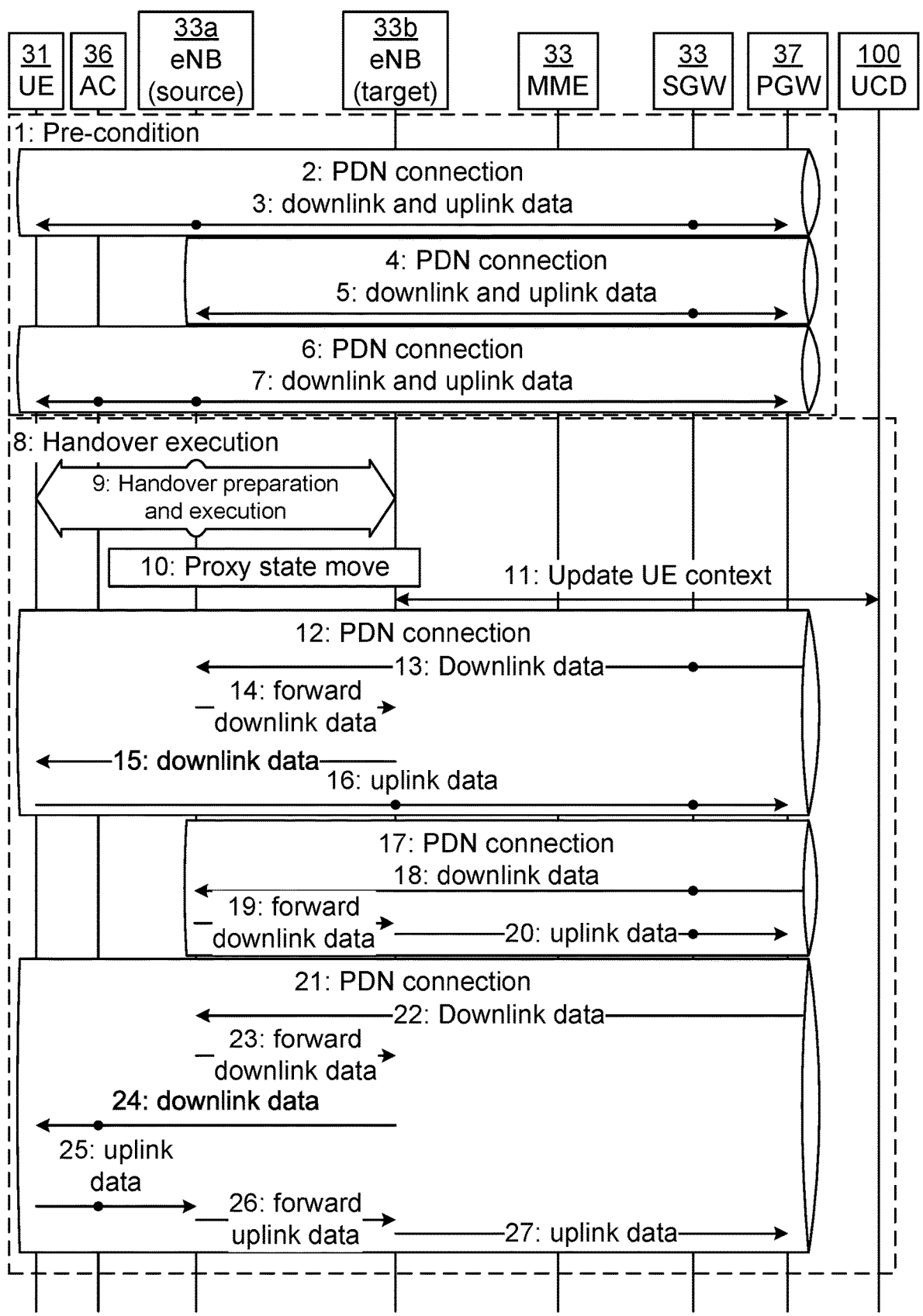
FIG. 16 is a schematic signalling diagram illustrating another example embodiment of a method of the present disclosure.
Figure 16B:
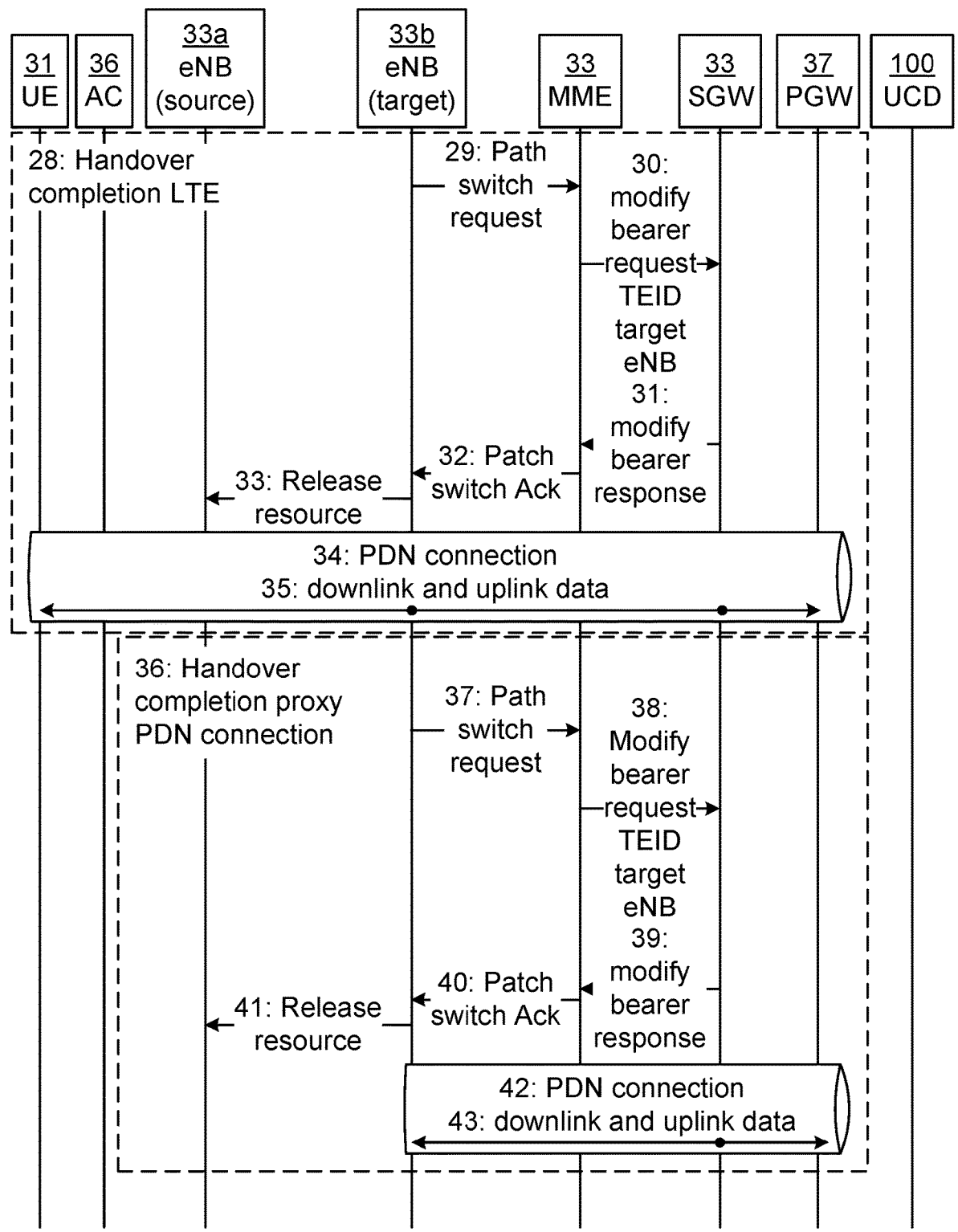
Figure 16C:
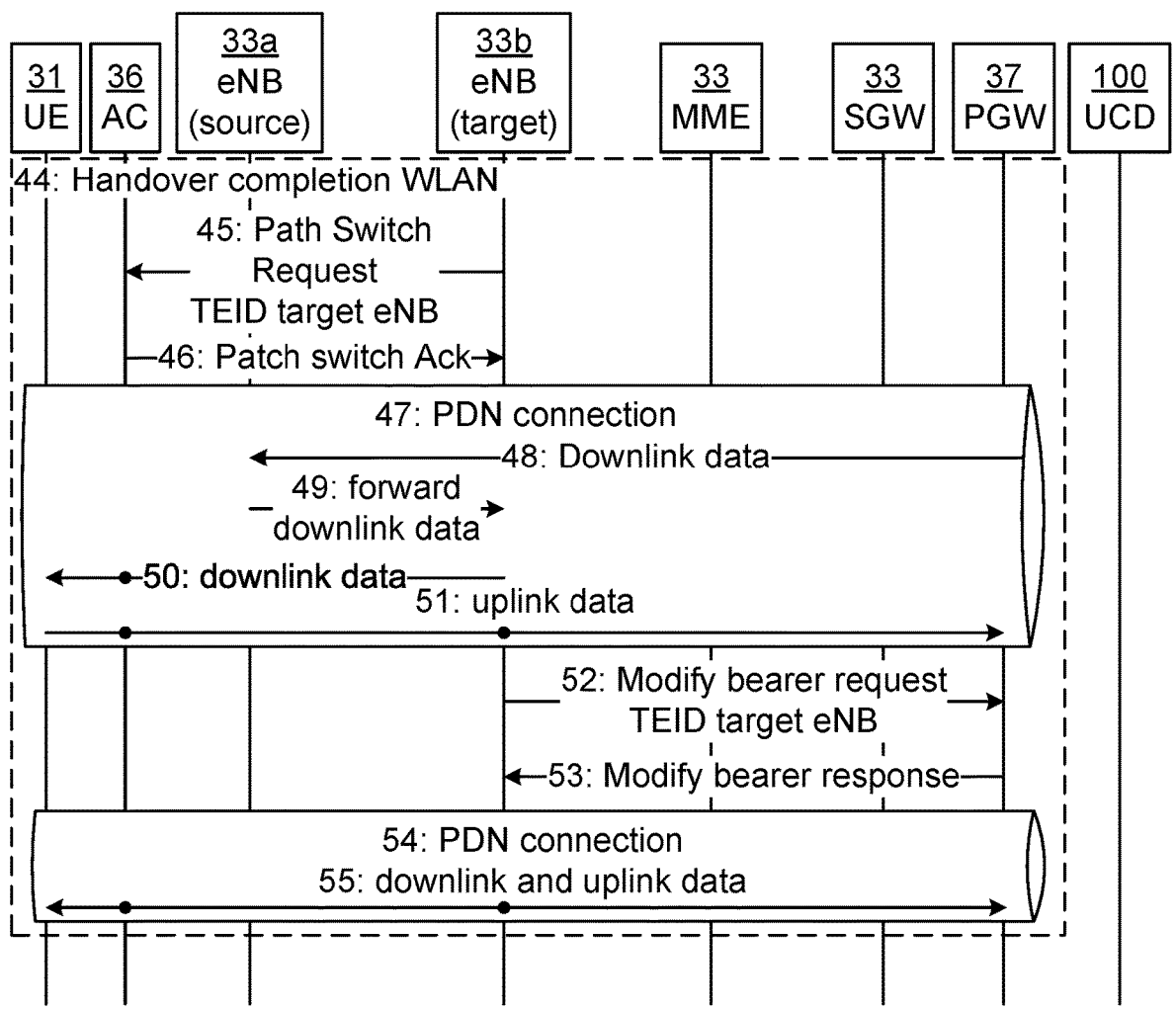

FIG. 16 shows a call flow for when the handover is performed in the LTE first access 32, as a specific embodiment of Example 1. The corresponding call flow for handover in the WLAN second access 35 is discussed in Example 9.

The call flow of FIG. 16 describes the case when the proxy 34 is co-located in an eNB 33 and a handover is performed on the UE's LTE radio. As part of the handover procedure the UE gets attached to a new eNB. The proxy eNB terminates a combined PDN connection for the MPTCP traffic (pre-condition, block 1). This connection can be setup by the proxy when the first and/or second subflow PDN connection is setup.

Initially the eNB 33a where the UE is attached to may be the same as the eNB terminating the PDN connection. As the UE moves, and handovers are made for the first subflow PDN connection, the proxy eNB and the eNB where the UE is attached to may become different eNBs. Upon handover of the PDN connection, a choice needs to be made to either move the proxy state to the target eNB 33b or keep the proxy state at the source eNB 33a. This decision may e.g. be based on operator deployment preference. In the call flow it is assumed that the decision is made to move the proxy state.

The call flow of FIG. 16 is based upon Example 1, with the following additions:

The proxy eNB terminates a combined PDN connection for the MPTCP traffic (pre-condition, block 1).

The proxy state is moved in steps 10 and 11. Block 17 shows how the combined PDN connection is routed afterwards.

Block 36 shows the handover completion for the combined PDN connection. This block can be performed before, after or in parallel with block 28 and block 44.

The following may be taken into account. Assume the UE 31 has a combined, first and second PDN connection setup. Assume that, for some reason, the UE looses its first PDN connection. When the UE later re-attaches to LTE access 32, it may have moved in the mean time, and may have ended up at a new eNB. That new eNB finds via the UCD 100 that the UE 31 already has a combined PDN connection on another eNB acting as proxy. In such scenario, the proxy state will need to be moved to the new eNB 33b.

EXAMPLE 8

Figure 17A:
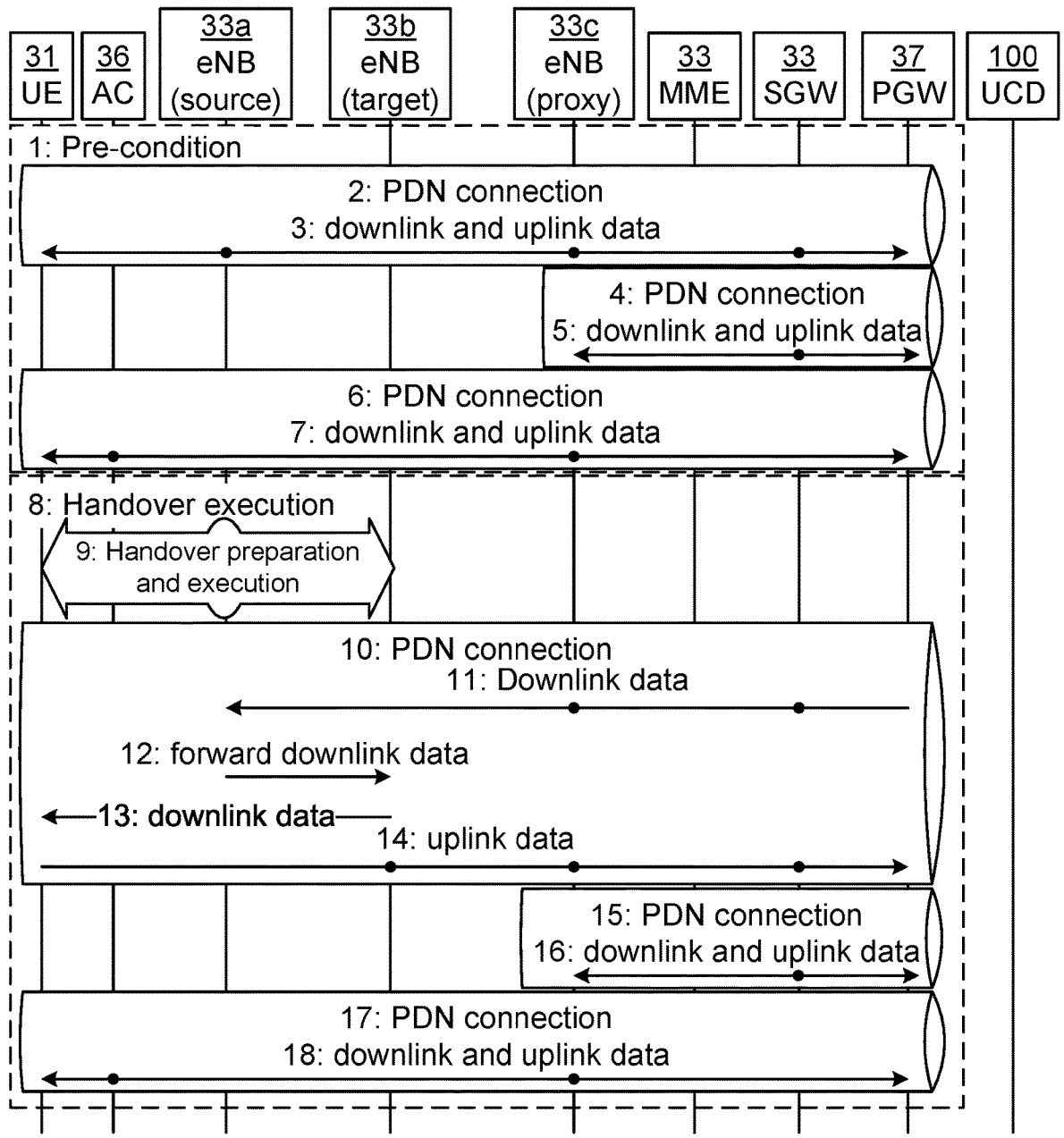
FIG. 17 is a schematic signalling diagram illustrating another example embodiment of a method of the present disclosure.
Figure 17B:
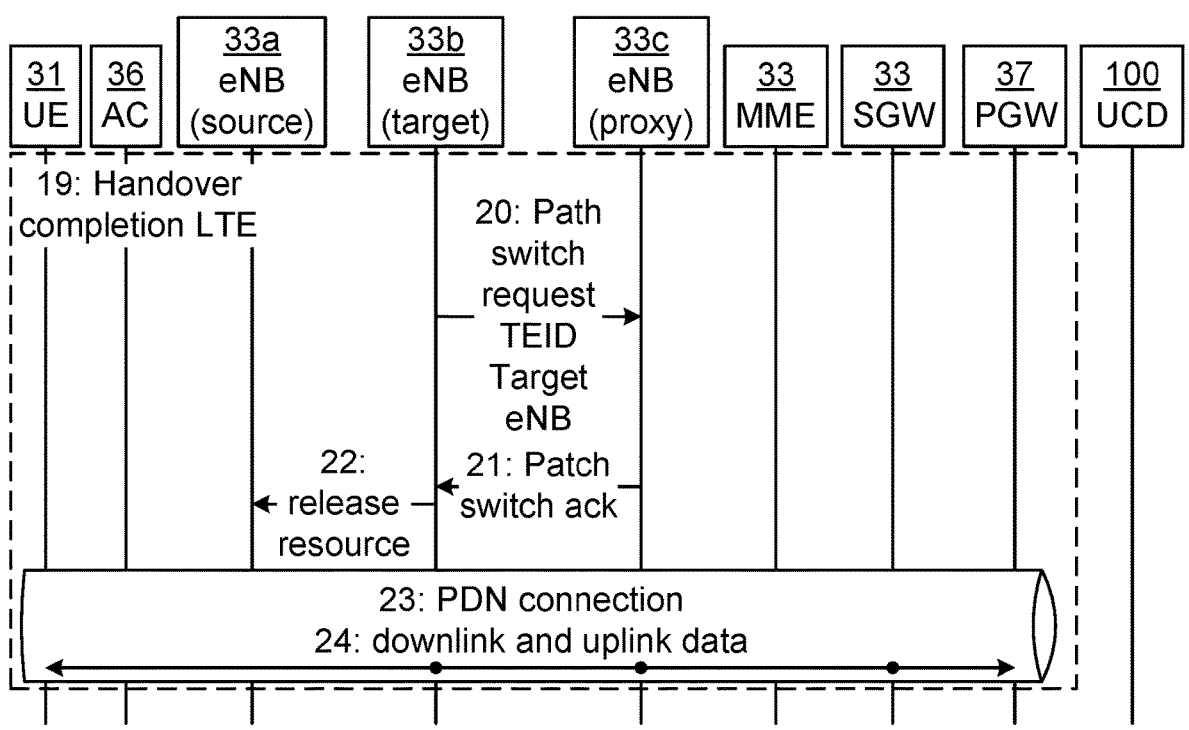

FIG. 17 shows a call flow which is based on that of FIG. 16 but where the proxy 34 is not moved. Tunnelling of the data is used instead.

The call flow is based on the previous, but with the difference that the proxy state is not moved when there is a handover of the first PDN connection.

The first PDN connection is routed via the proxy eNB 33c (pre-condition, block 4). There may be tunneling (e.g. GTP) between the source and target eNBs 33a and 33b (one of which may be the same as the proxy eNB 33c).

The handover completion for the first PDN connection, block 19, is performed from the target eNB 33b to the proxy 34.

The following may be taken into account. Assume the UE has a combined, first and second PDN connection setup. Assume that, for some reason, the UE looses its first PDN connection. When the UE later re-attaches to the LTE first access 32, it may have moved in the mean time and may have ended up at a new eNB. That new eNB finds via the UCD that the UE already has a combined PDN connection on another (target) eNB 33b acting as proxy. In such scenario, the new eNB will need to setup the new first PDN connection via the target eNB 33b acting as proxy.

EXAMPLE 9

Figure 18:
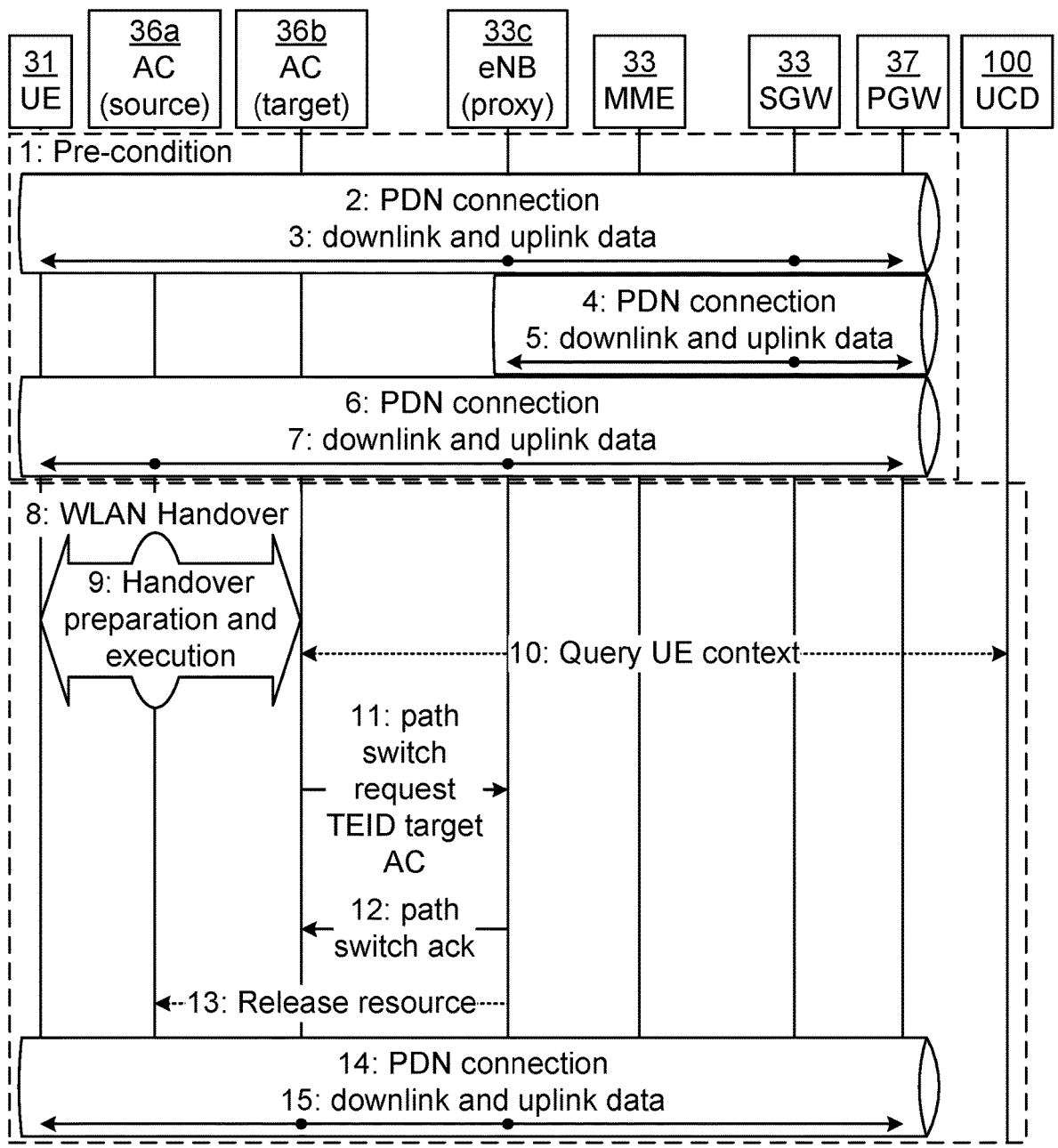
FIG. 18 is a schematic signalling diagram illustrating another example embodiment of a method of the present disclosure.

FIG. 18 shows a call flow of a specific embodiment of the embodiment of Example 2. Compared with example 4, the proxy 34 now also has a combined PDN connection. Upon a WLAN handover, the combined and first PDN connections do not need to be moved.

Note that the eNB 33 serving the first connection and the eNB 33 serving as proxy may be two different eNBs. This is not relevant in this particular call flow, why these two eNBs 33 are shown as one.

EXAMPLE 10

The solutions of examples 5 and 6 may be regarded as variants of the solutions of examples 3 and 4, where MPTCP traffic is broken out of the second PDN connection. The same idea can be applied on examples 7-9 for a fourth solution variant as a variation of examples 7-9. Furthermore, if the eNB 33a where the UE 31 is attached to (first PDN connection) is a different one then the eNB 33c acting as proxy, then the former can break out traffic to the latter. The way the break-out is done is similar to the break out performed for the second PDN connection.

EXAMPLE 11

Figure 19:
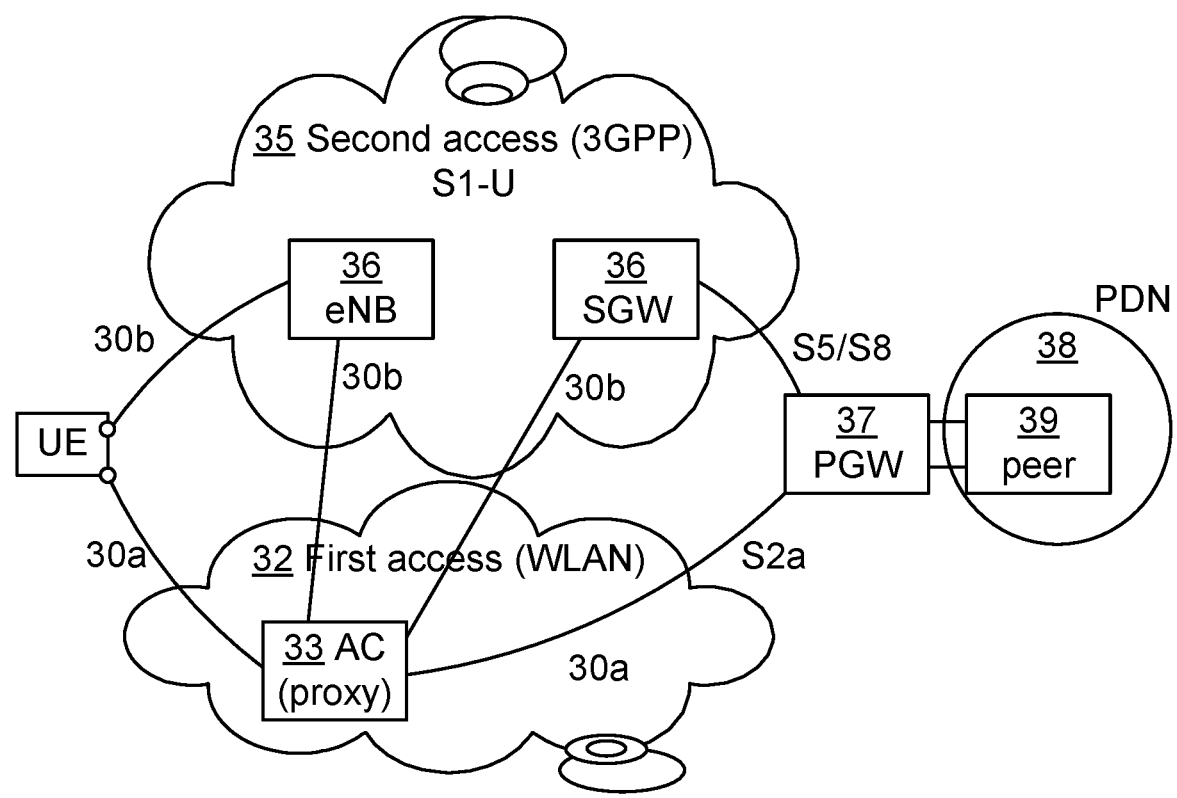
FIG. 19 is a schematic block diagram of an example embodiment of a communication network, in accordance with the present disclosure.

In the above examples 3-10, it was assumed that the first access 32 is an LTE access. The present and following examples instead assume that the first access is a WLAN access. FIG. 19 illustrates an embodiment of a communication system in accordance with the present disclosure, where the first access 32 is a WLAN access and the second access 35 is a 3GPP access, e.g. LTE. The first MPTCP subflow 300a is over the WLAN access 32 via the AC 33 comprising the MPTCP proxy 34, and via the PGW mobility anchor 37 to the peer 39 in the PDN 38. The second subflow 30b is over the 3GPP access 35 but is routed via the proxy 34 of the AC 33 in the WLAN access 32. In the specific embodiment of FIG. 19, the second subflow is routed via the proxy between the eNB 36 and the SGW 36 of the 3GPP access 35, but other alternatives are also possible. Thus, in this architecture alternative, we assume that the proxy 34 is co-located with the AC 33. In the following examples, it is assumed that the UE already has done an initial attach over both its 3GPP and its WLAN accesses.

As mentioned above, the proxy 34 may use different IP addresses. Either complete PDN connections are routed through the proxy, or the network breaks out MPTCP traffic from a PDN connection to the proxy. This leads to four different solution variants (as discussed above in examples 3-10, see especially the discussion in Example 10, regarding when the proxy is in the 3GPP access). Examples 3-10 discussed these four variants in detail for a proxy positioned in a 3GPP access. For when the first access 32 is a WLAN access, we will only give detailed call flows for the third solution variant (corresponding to the examples 7-9 above), because this is the most complex one. It will be understood that the other three variants also apply for WLAN access, and that the call flows can be deduced from combining the information in the previous examples with the information in the call flows of FIGS. 20-24.

It is assumed that the proxy 34 is located in the WLAN AC 33. It is however also possible to include the proxy as part of any other function or node in the WLAN (e.g. Wi-Fi) access network, one such example being the WLAN AP. Further, it is assumed that a combined PDN connection is used by the proxy 34 to carry MPTCP traffic from a first and/or second PDN connection. We also assume that the first/second PDN connections terminate in the PGW 37. The present example relates to the case when the radio device 31 is handed over in the second (LTE) access 35, a special case of Example 2.

Figure 20A:
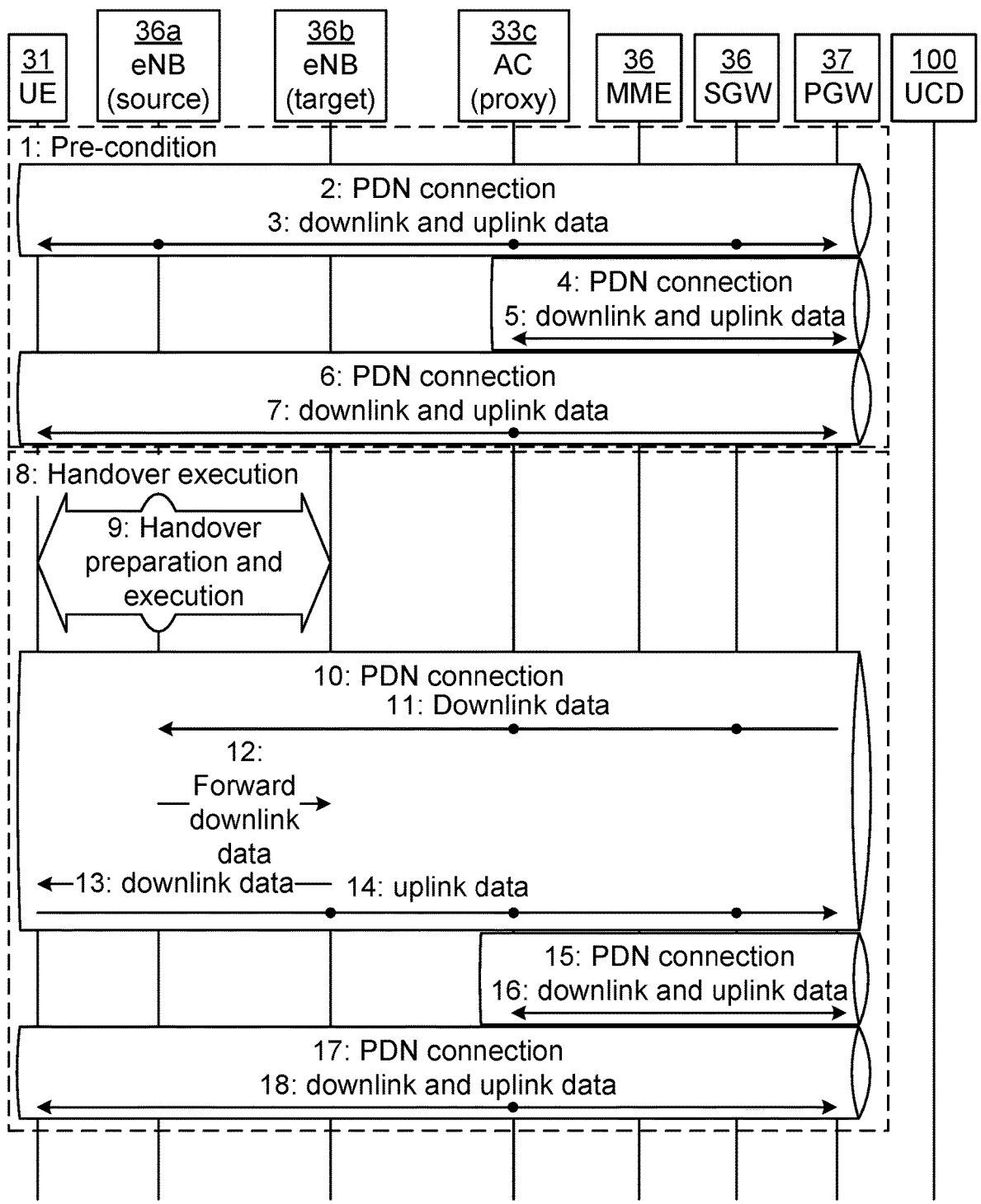
FIG. 20 is a schematic signalling diagram illustrating an example embodiment of a method of the present disclosure.
Figure 20B:
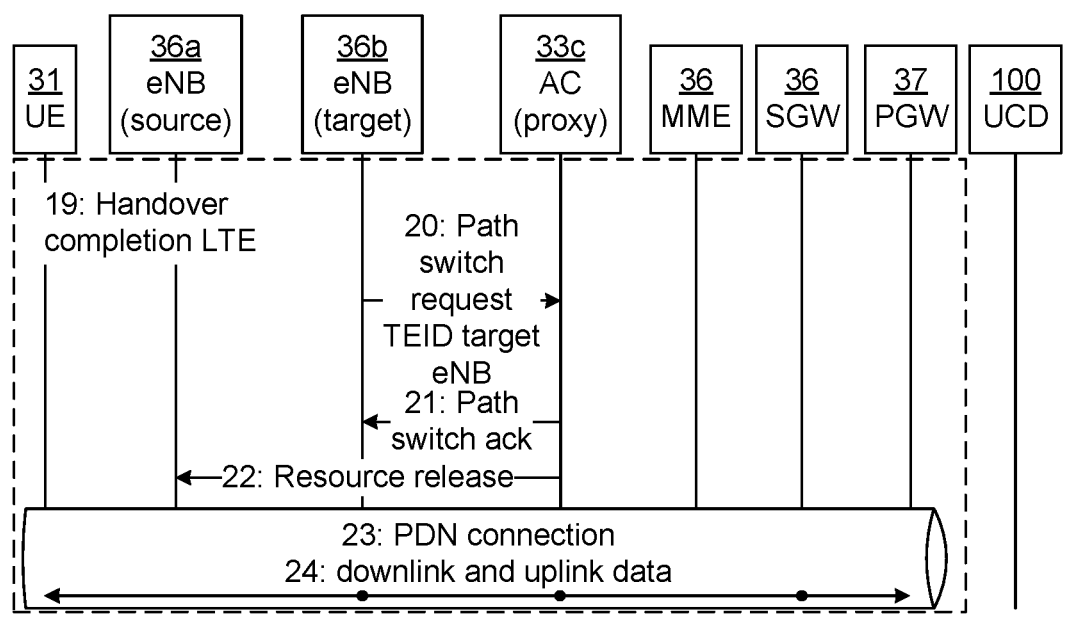

The call flow of FIG. 20 describes the case when the proxy is co-located in an AC 33 and a handover is performed on the UE's LTE access 35 (the second access 35). As part of the handover procedure the UE gets attached to a target eNB 36b. Step 9 equals step 7 in Example 7. It is noted that there is handover completion for LTE, block 19. The target eNB 36b does not inform the MME 36 that a handover has been made, but informs the proxy 34 in the AC 33c instead. Note that the AC 33 serving the first connection and the AC 33c comprising the proxy 34 may be two different ACs 33. This may not be relevant in this particular call flow, why these two ACs are depicted as one, as the AC 33c (corresponding to the first GW 33c in the terminology used herein).

EXAMPLE 12

Figure 21A:
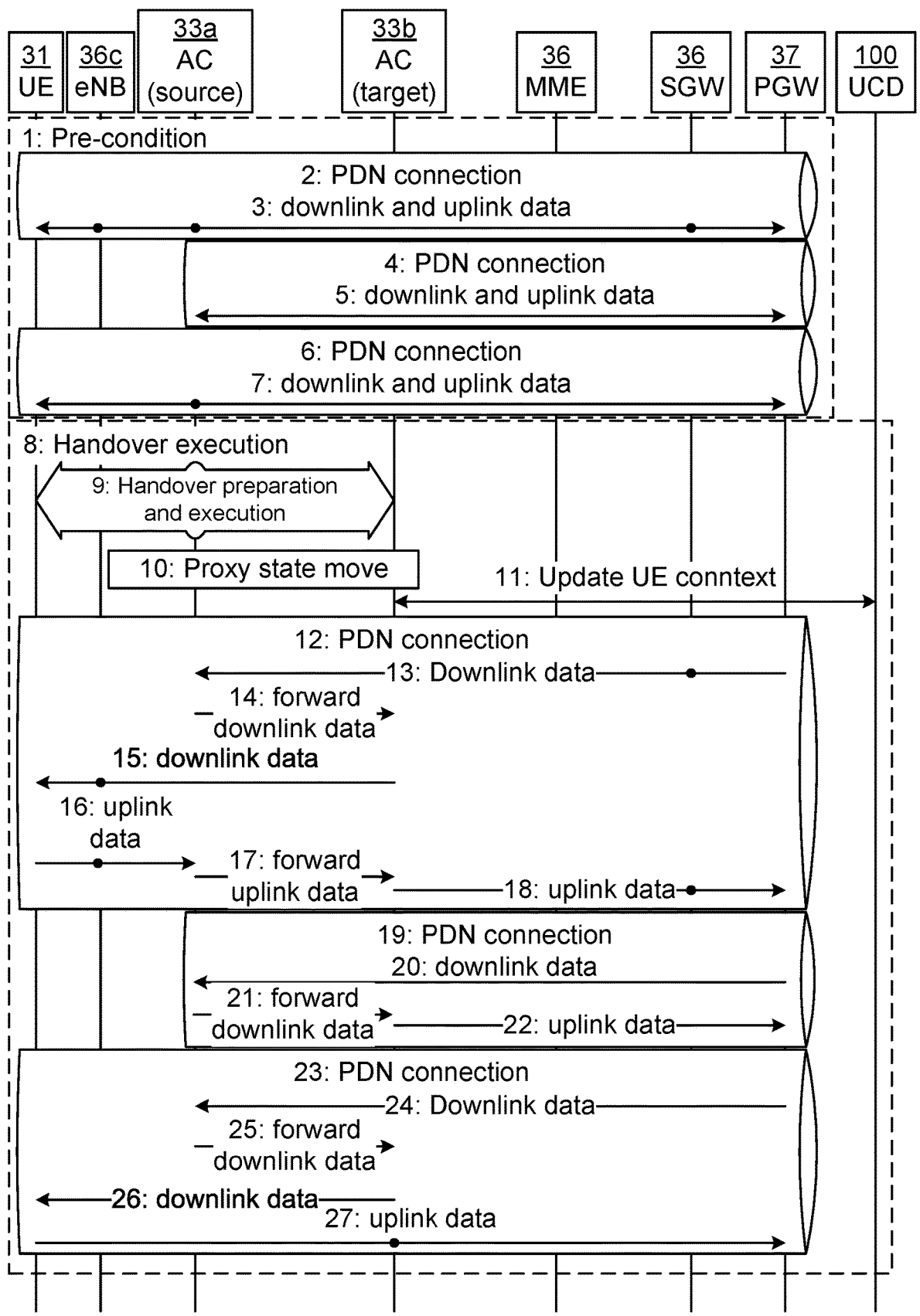
FIG. 21 is a schematic signalling diagram illustrating another example embodiment of a method of the present disclosure.
Figure 21B:
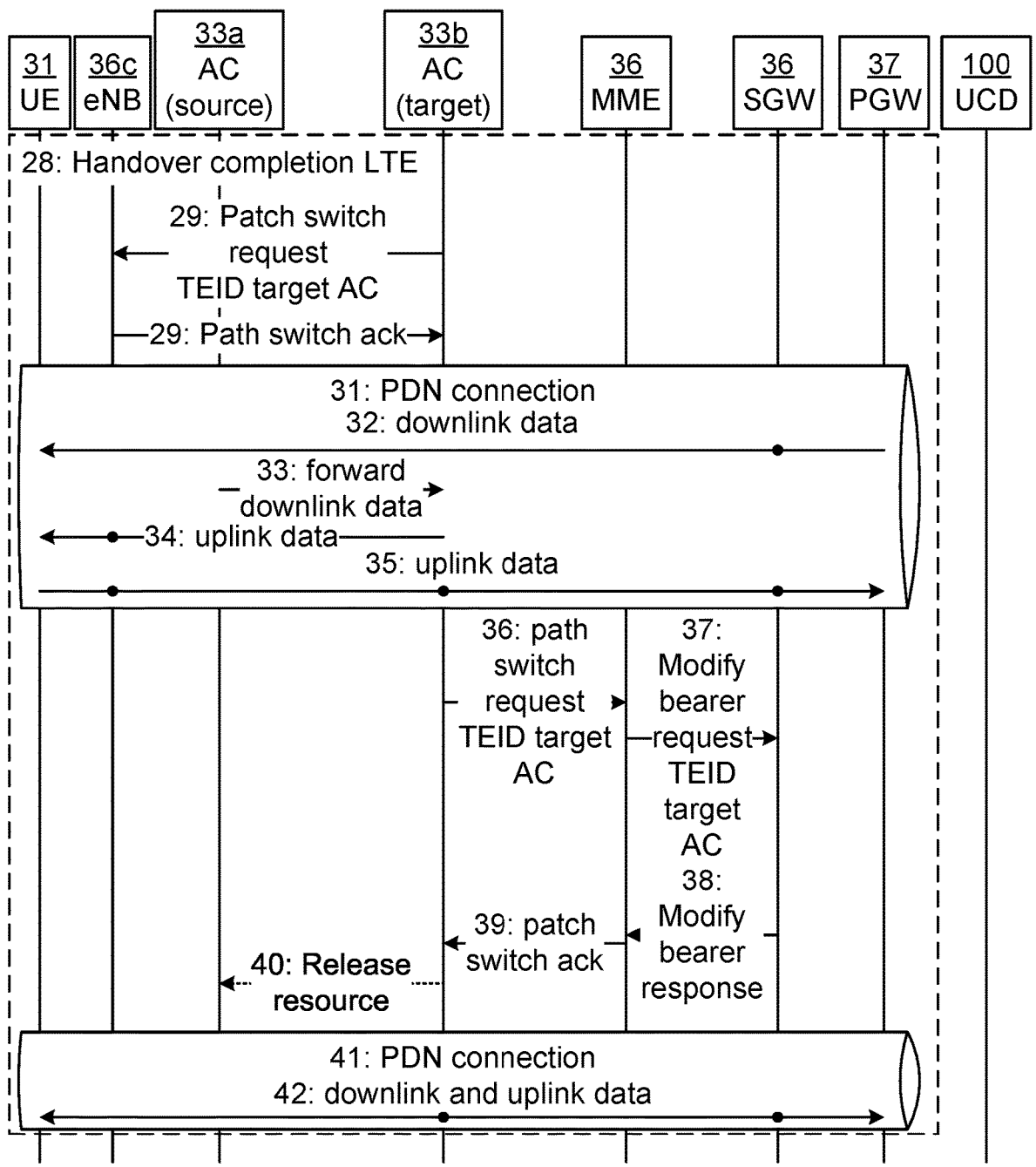
Figure 21C:
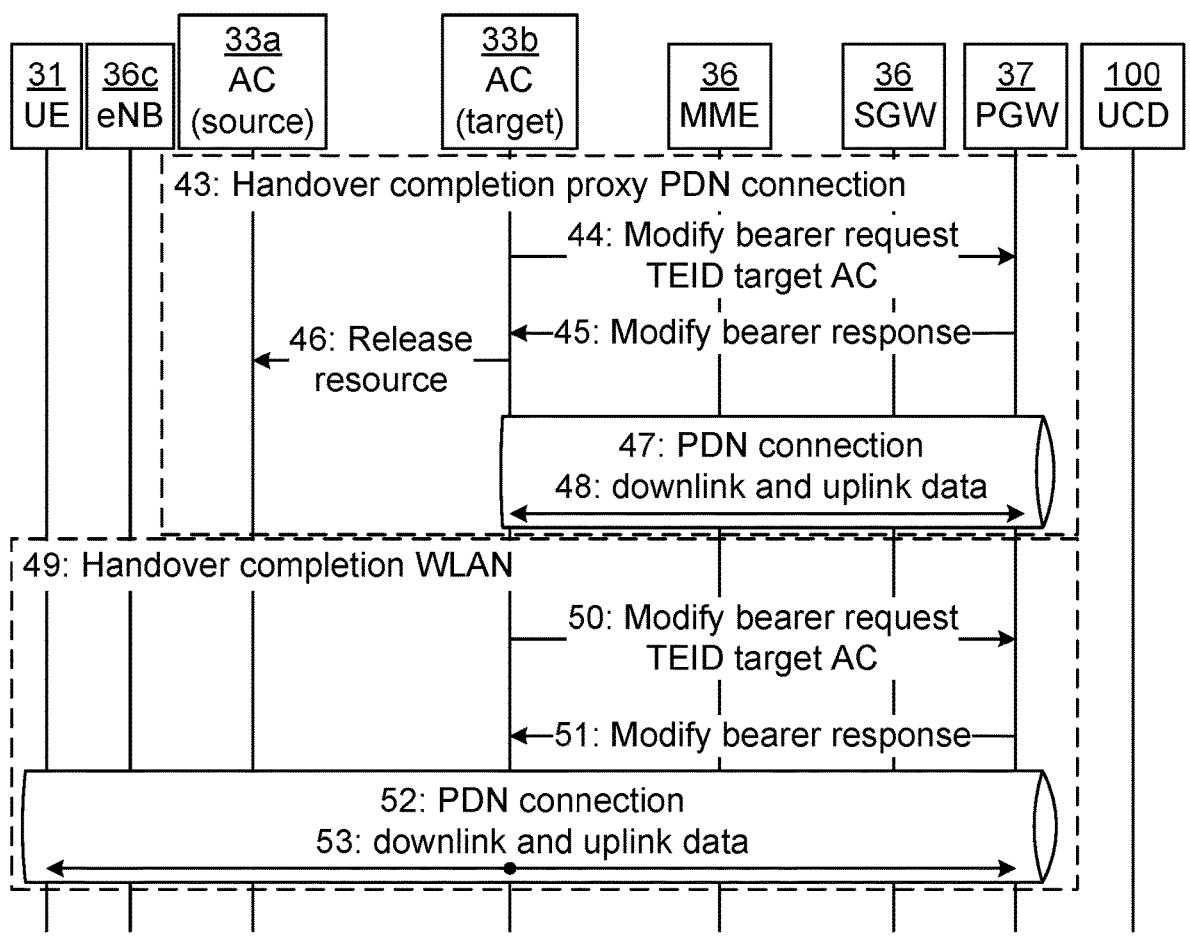
Figure 22A:
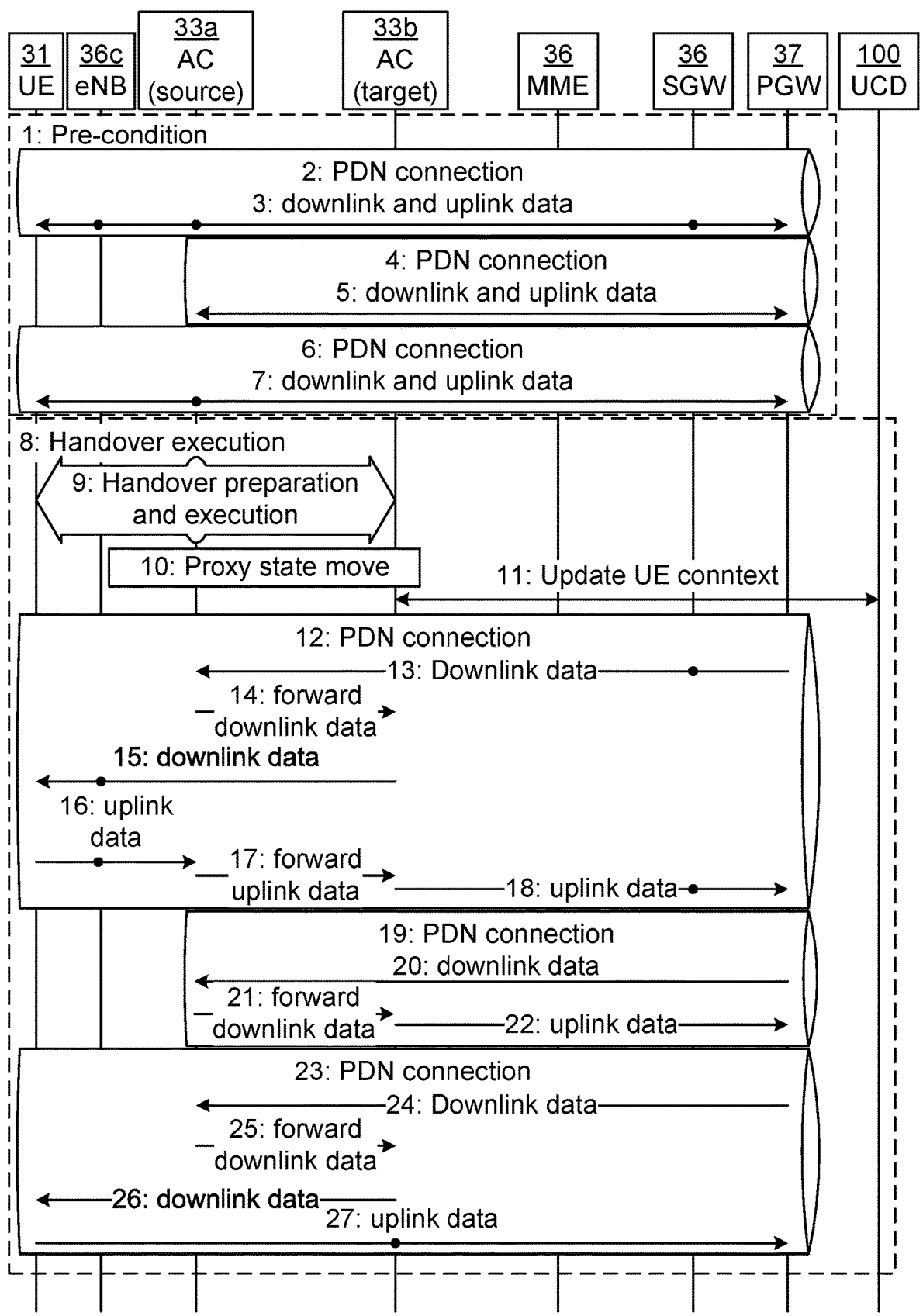
FIG. 22 is a schematic signalling diagram illustrating another example embodiment of a method of the present disclosure.
Figure 22B:
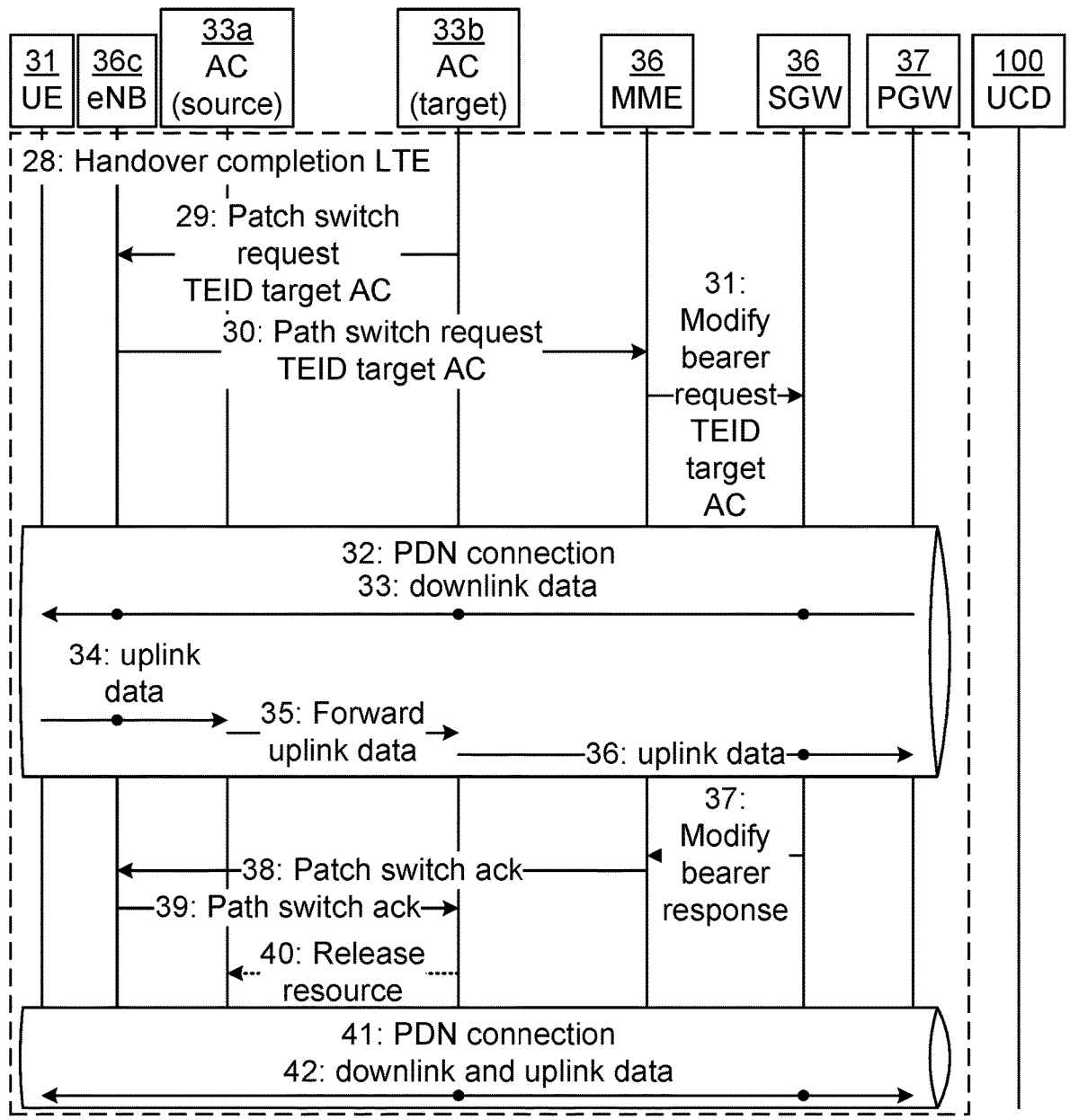
Figure 22C:
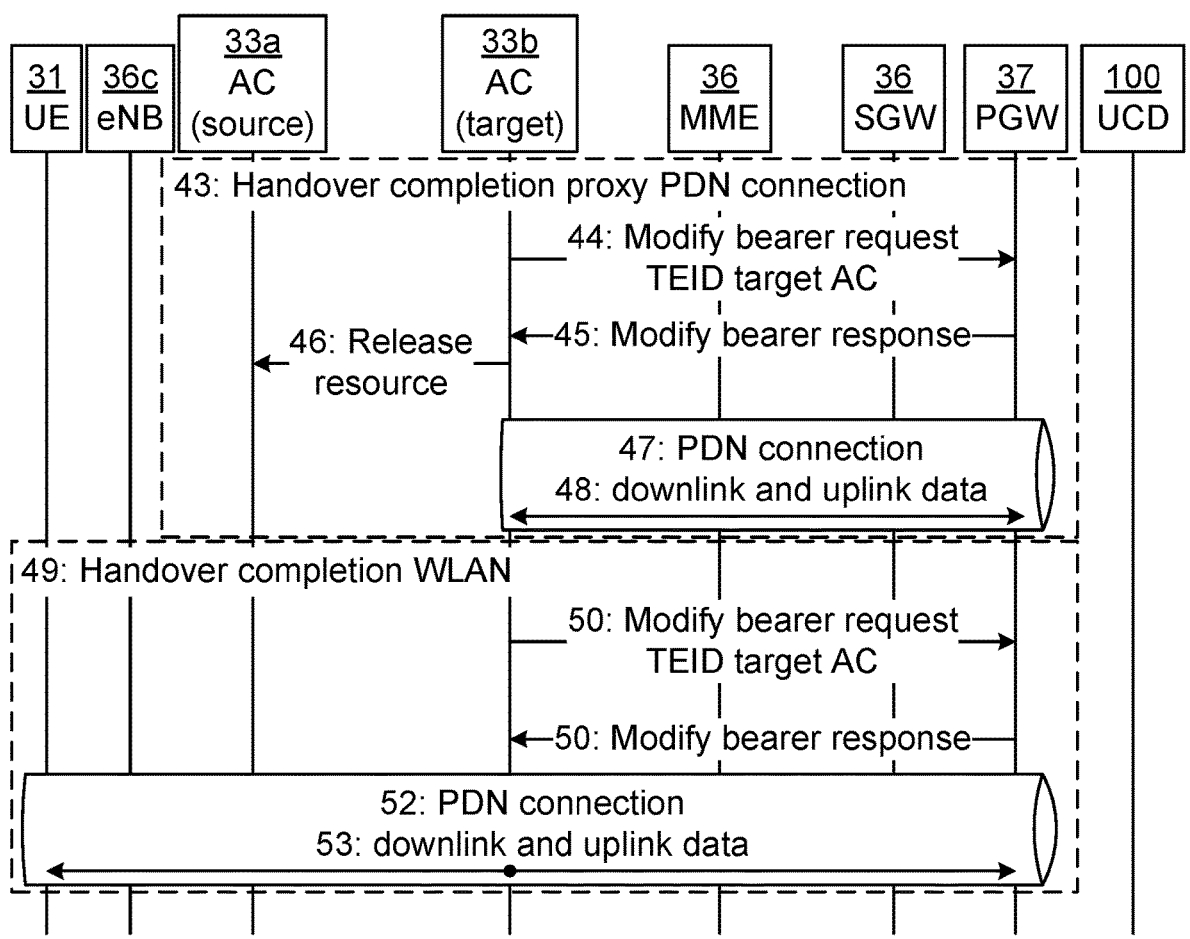

The call flow of FIG. 21 describes the case when the proxy 34 is co-located in an AC 33 and a handover is performed on the UE's WLAN access 32 (the first access 32). For WLAN handover, FIG. 21 describes the case when such handover leads to a change of AC serving the UE 31. Similar to examples 7 and 8, we distinguish two sub-cases, one sub-case where the proxy state is moved (as in the present example, which is also a variant of Example 1), and one sub-case one where the proxy is not moved (Example 13).

In FIG. 21, step 9 and step to are similar to the corresponding steps in Example 7. However, in FIG. 21, step 9 may include a query from the target AC 33b to UCD 100 in order to find the source AC 33a. This is in particular required if the source and target AC 33 do not communicate as part of step 9.

The steps in block 28 update the eNB 36c and the SGW 36 with the target AC 33b. In this call flow the AC talks S1-MME to the MME 36. Alternatively, S1-MME is left intact and the eNB 36c informs the MME. This is shown in the call flow of FIG. 22. In the call flow of FIG. 22, the eNB 36c performs step 30 containing an identifier of the target AC 33b.

EXAMPLE 13

This example corresponds to Example 8 but with the first access 32 being a WLAN access instead of an LTE access.

Figure 23:
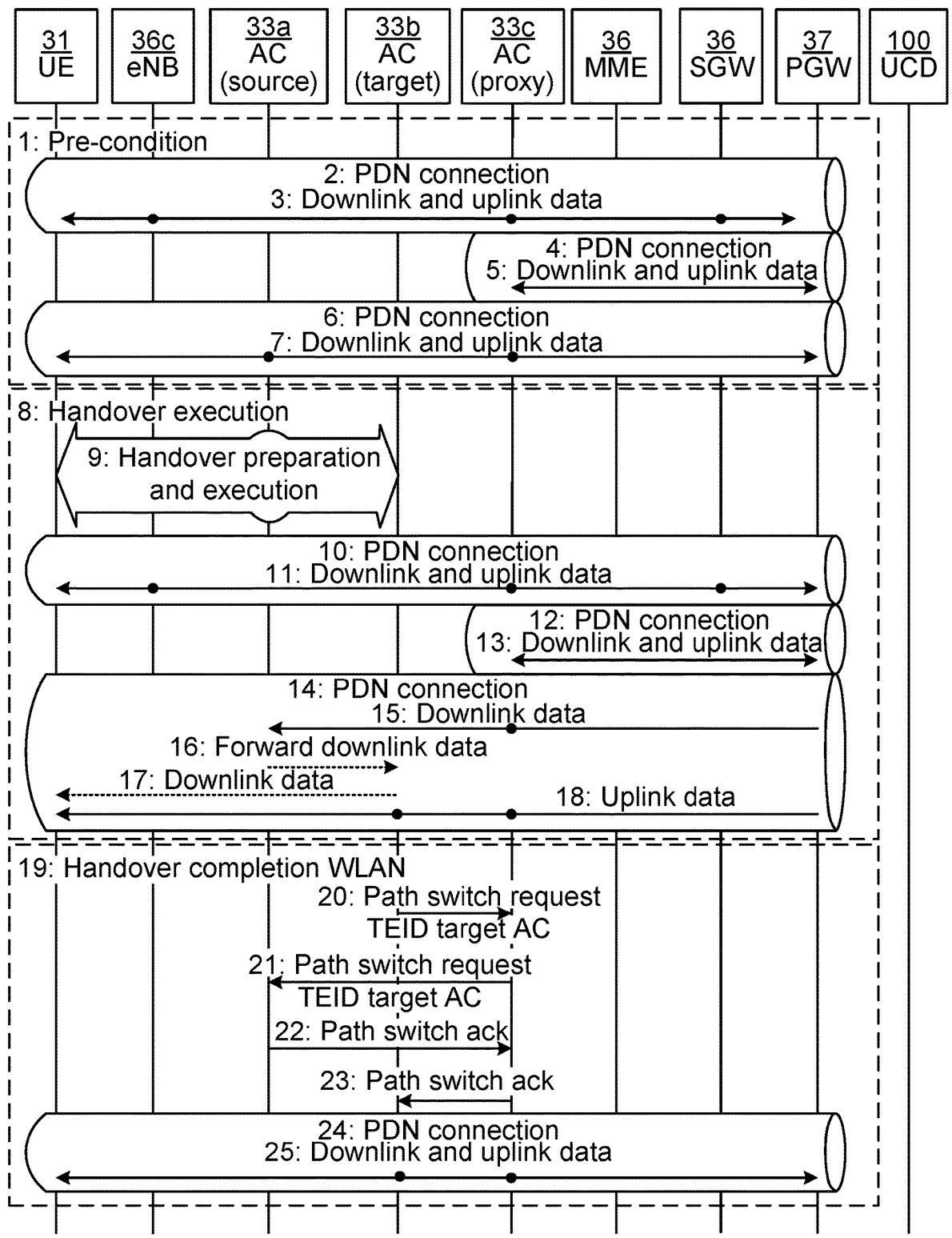
FIG. 23 is a schematic signalling diagram illustrating another example embodiment of a method of the present disclosure.

In FIG. 23 is a call flow when the proxy state is thus not moved. This call flow is a simplification of the previous call flows of FIG. 20, because the combined and first PDN connections remain unchanged.

If the source and target AC 33 did not communicate as part of step 9, then the source AC 33a will not be able to forward downlink data to the target AC 33b. Therefore, step 16 and 17 are dashed. Downlink traffic will in that case be lost. It is noted that the handover in WLAN is completed (block 19). The proxy 34 needs to be informed to re-route downlink traffic to the target AC 33b. This is performed in steps 20-23.

EXAMPLE 14

Yet another architectural variant is to place the proxy in the SGW 33, i.e. when the first access 32 is an LTE access (as in examples 3-10). This leads to a solution very similar as described in examples 3-10 where the proxy is placed in the eNB 33. For the handover of the LTE connection, the call flows in examples 3-10 were based on the X2-based handover without SGW relation. In the present example, we instead use the X2-based handover with SGW relocation (see section 5.5 in 3GPP TS 23.401).

In the present example, in analogy with examples 11-13, we only give detailed call flows for the third solution variant (corresponding to the examples 7-9 above), because this is the most complex one. It will be understood that the other three variants also apply, and that the call flows can be deduced from combining the information in examples 3-10 with the information in the call flow of FIG. 24.

In the present example, we assume that a combined PDN connection is used by the proxy 34 to carry MPTCP traffic from a first and/or second PDN connection. We also assume that the first/second PDN connections terminate in the PGW 37.

Only the case with handover on the first access (LTE) 32 is described herein. As part of the handover procedure the UE 31 gets attached to a new eNB 33 and a target SGW 33b. We only describe the variant where the proxy 34 is moved to the target SGW 33b. It will be understood that the variant where the proxy is not moved, and the case with handover on the second access (WLAN) 35 also apply. These call flows can be deduced from combining the information in examples 3-10 with the information in the call flow of FIG. 24.

Figure 24A:
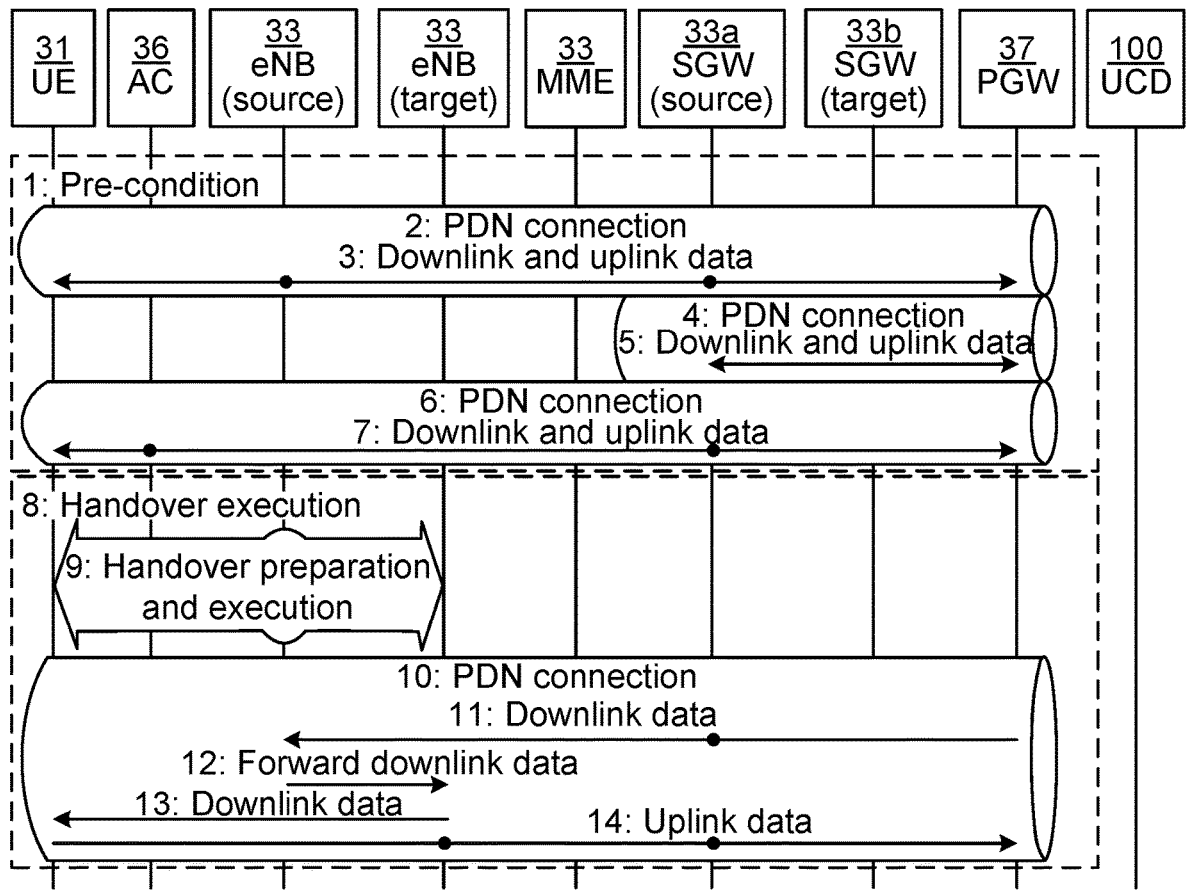
FIG. 24 is a schematic signalling diagram illustrating another example embodiment of a method of the present disclosure.
Figure 24B:
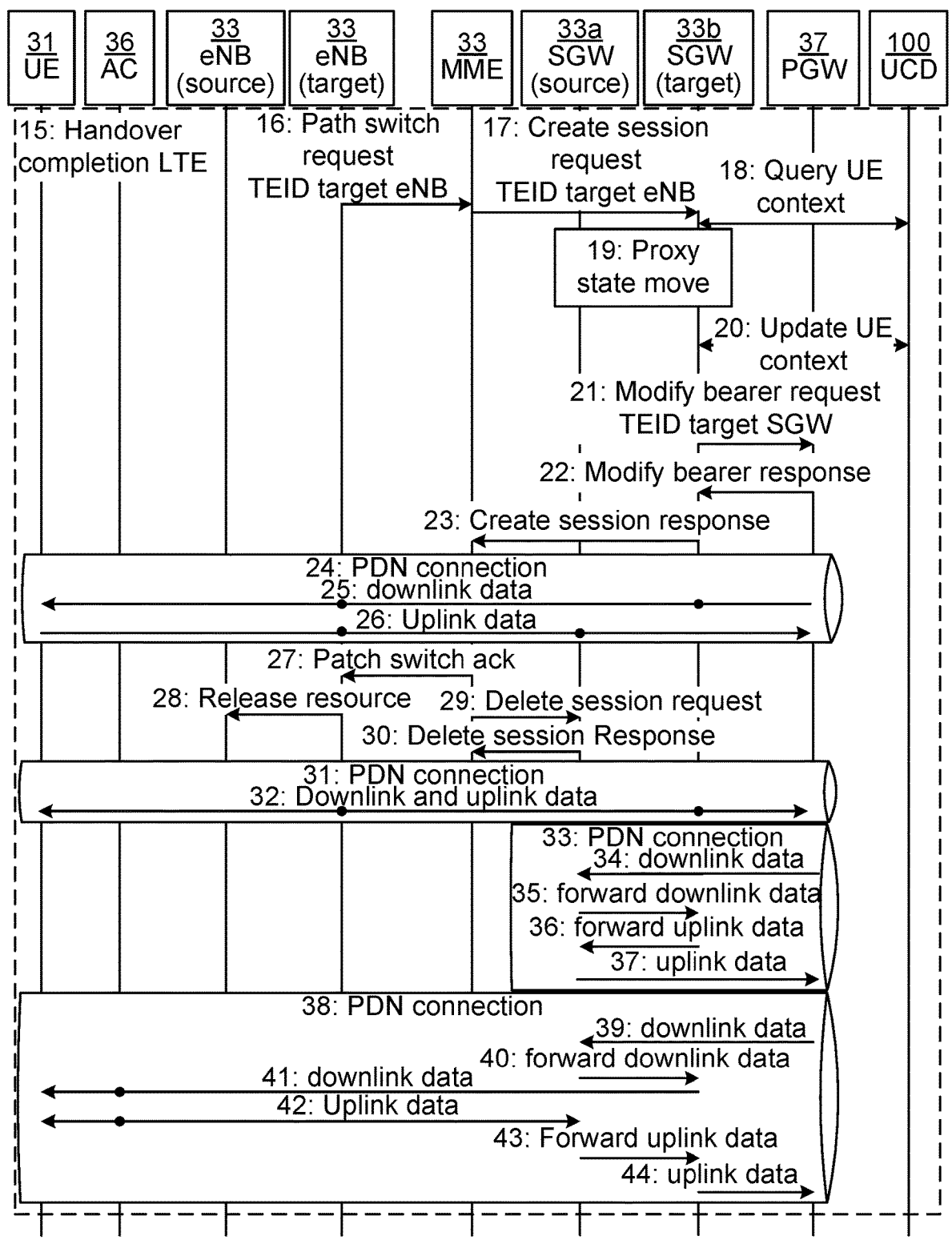
Figure 24C:
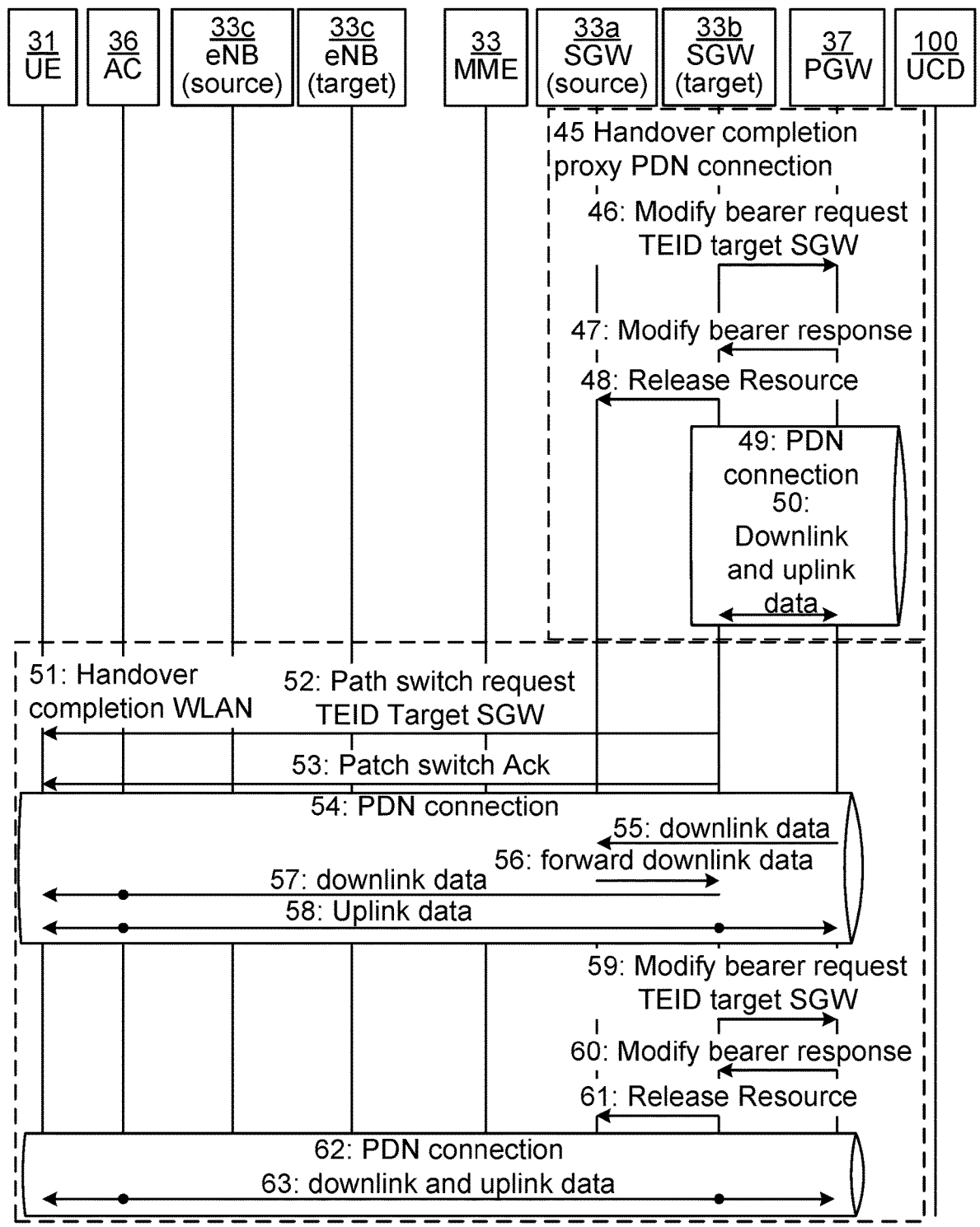

It is noted in FIG. 24 that there is the moving of the proxy state in the SGW from the source SGW 33a to the target SGW 33b. As a consequence, the completion of in particular the handover completion of the LTE part (block 15) is different from previous examples.

Step 18 may be required for the target SGW 33b to find the proxy 34 in the source SGW 33a. After moving the proxy state in step 19, the source SGW starts forwarding downlink data to the target SGW, and vice versa for the uplink.

Note that the handover completion of the combined proxy PDN connection, block 45, needs to executed after the moving of the proxy state 34.

Herein, mechanisms on how the MPTCP proxy 34 service is continued when the UE 31 moves between radio cells and the proxy is logically placed in front of the mobility anchor 37, e.g. a PGW. This way, it may be possible to provide an MPTCP proxy service when such proxy is not placed in the PGW. The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a source gateway which is logically positioned in a first wireless access network between a radio device and a first mobility anchor, said source gateway comprising a Multipath Transmission Control Protocol (MPTCP) proxy for a TCP flow between the radio device and a peer, said TCP flow comprising at least two subflows between the radio device and the source gateway, the subflows comprising a first subflow over the first wireless access network and a second subflow over a second wireless access network, the method comprising:
receiving uplink data of the second subflow from a second gateway logically positioned in the second wireless access network between the radio device and a second mobility anchor, and sending downlink data of the second subflow to said second gateway;
moving the proxy from the source gateway to a target gateway logically positioned in the first wireless access network between the radio device and the first mobility anchor, as part of a handover of the radio device within the first wireless access network; and
after having moved the proxy to the target gateway, forwarding downlink data of both the first and second subflows to the target gateway, and forwarding the received uplink data of the second subflow to the target gateway.

2. The method of claim 1, wherein the first wireless access network is a cellular communication network in accordance with a Third Generation Partnership Project (3GPP) communication standard.

3. The method of claim 2, wherein the source gateway is comprised in a radio access network (RAN) node; or in a Core Network (CN) node.

4. The method of claim 1, wherein the first wireless access network is a Wireless Local Area Network (WLAN).

5. The method of claim 4, wherein the source gateway is comprised in a WLAN node; or a Trusted Wireless Access Gateway (TWAG) or an Evolved Packet Data Gateway (ePDG) as defined by 3GPP.

6. The method of claim 1, further comprising:
releasing resources for the first subflow, whereby the forwarding of data of the first subflow is discontinued.

7. The method of claim 1, further comprising:
releasing resources for the second subflow, whereby the forwarding of data of the second subflow is discontinued, after the source gateway no longer receives uplink data from the second gateway.

8. The method of claim 1, wherein the first and/or the second mobility anchor is comprised in a PDN gateway (PGW).

9. The method of claim 1, wherein the second mobility anchor is co-located with the first mobility anchor.

10. The method of claim 1, wherein the proxy acts as a Network Address Translator (NAT), whereby the TCP flow between the proxy and the peer uses an Internet Protocol(IP) address different from IP addresses used in either of the first and second subflows.

11. A source gateway configured for being logically positioned in a first wireless access network between a radio device and a first mobility anchor, and for comprising a Multipath Transmission Control Protocol (MPTCP) proxy for a TCP flow between the radio device and a peer, said TCP flow comprising at least two subflows between the radio device and the source gateway, the subflows comprising a first subflow over the first wireless access network and a second subflow over a second wireless access network, the source gateway comprising:
processor circuitry; and
a storage unit storing instructions executable by said processor circuitry whereby said source gateway is operative to:
receive uplink data of the second subflow from a second gateway logically positioned in the second wireless access network between the radio device and a second mobility anchor, and send downlink data of the second subflow to said second gateway;
move the proxy from the source gateway to a target gateway logically positioned in the first wireless access network between the radio device and the first mobility anchor as part of a handover of the radio device within the first wireless access network; and
after having moved the proxy to the target gateway, forward downlink data of both the first and second subflows to the target gateway, and forward the received uplink data of the second subflow to the target gateway.

12. A first gateway configured for being logically positioned in a first wireless access network between a radio device and a first mobility anchor, and for comprising a Multipath Transmission Control Protocol (MPTCP) proxy for a TCP flow between the radio device and a peer, said TCP flow comprising at least two subflows between the radio device and the first gateway, the subflows comprising a first subflow over the first wireless access network and a second subflow over a second wireless access network, the first gateway comprising:
processor circuitry; and
a storage unit storing instructions executable by said processor circuitry whereby said first gateway is operative to:
receive uplink data of the second subflow from a source gateway logically positioned in the second wireless access network between the radio device and a second mobility anchor, and send downlink data of the second subflow to said source gateway;
receive instructions to discontinue communication with the source gateway and to set up communication with a target gateway logically positioned in the second wireless access network between the radio device and the second mobility anchor as part of a handover of the radio device within the second wireless access network; and
after having received the instructions, receive uplink data of the second subflow from the target gateway, and send downlink data of the second subflow to said target gateway.

13. A non-transitory computer readable medium comprising computer-executable components for causing a source gateway to perform the method of claim 1 when the computer-executable components are run on processor circuitry comprised in the source gateway.

* * * * *